(12) United States Patent
Kato

(10) Patent No.: US 11,474,534 B2
(45) Date of Patent: Oct. 18, 2022

(54) INFORMATION PROCESSING SYSTEM

(71) Applicant: Mitsubishi Electric Corporation, Tokyo (JP)

(72) Inventor: Yoshiyuki Kato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 632 days.

(21) Appl. No.: 16/479,857

(22) PCT Filed: Mar. 1, 2017

(86) PCT No.: PCT/JP2017/008199
  § 371 (c)(1),
  (2) Date: Jul. 22, 2019

(87) PCT Pub. No.: WO2018/158896
  PCT Pub. Date: Sep. 7, 2018

(65) Prior Publication Data
  US 2021/0333798 A1    Oct. 28, 2021

(51) Int. Cl.
  *G06F 3/01*    (2006.01)
  *G05D 1/02*    (2020.01)
  *A61H 1/02*    (2006.01)

(52) U.S. Cl.
  CPC .......... *G05D 1/0251* (2013.01); *A61H 1/0262* (2013.01); *G05D 1/0223* (2013.01);
  (Continued)

(58) Field of Classification Search
  CPC .. G05D 1/0251; G05D 1/0223; G05D 1/0276; G05D 2201/0217; A61H 1/0262;
  (Continued)

(56) References Cited

U.S. PATENT DOCUMENTS 6,152,854 A * 11/2000 Carmein ................. G06F 3/011
                                                    198/779
6,563,489 B1 * 5/2003 Latypov .................. G09B 9/00
                                                    345/164

(Continued)

FOREIGN PATENT DOCUMENTS

JP          2923493 B1       7/1999
JP       2005084356 A  *    3/2005

(Continued)

OTHER PUBLICATIONS

Perry et al., "Gait Analysis: Normal and Pathological Function", Ishiyaku Publishers, Inc., 2007, Total No. Pgs. 10.

*Primary Examiner* — Amare Mengistu
*Assistant Examiner* — Gloryvid Figueroa-Gibson
(74) *Attorney, Agent, or Firm* — Birch, Stewart, Kolasch & Birch, LLP

(57) ABSTRACT

Each of three floors is adjacent to the other two floor robots so that a position at which three vertices selected each from the three floor robots face each other is set as a central point, and an information processing apparatus includes a floor robot guidance unit to specify an advancing direction and a walking speed of a walking person based on pressures detected by the floor robots when the walking person walks, to move the three floor robots at the specified walking speed in an opposite direction to the specified advancing direction, to specify, as a target vertex, a vertex that can be determined to lie in the specified advancing direction, other than the three vertices, and rotate at least one of the three floor robots so that the position of the target vertex is set as a new central point.

10 Claims, 24 Drawing Sheets

(52) U.S. Cl.
CPC .......... *G05D 1/0276* (2013.01); *G06F 3/011* (2013.01); *G06F 3/012* (2013.01); *A61H 2201/1207* (2013.01); *A61H 2201/5071* (2013.01); *A61H 2203/0406* (2013.01); *G05D 2201/0217* (2013.01); *G06F 2203/012* (2013.01)

(58) Field of Classification Search
CPC .... A61H 2201/1207; A61H 2201/5071; A61H 2203/0406; G06F 3/011; G06F 3/012; G06F 2203/012
See application file for complete search history.

(56) References Cited

U.S. PATENT DOCUMENTS

2016/0216759 A1 7/2016 Goetgeluk
2017/0252642 A1* 9/2017 Matina .................. A63F 13/214

FOREIGN PATENT DOCUMENTS

JP 2008-220580 A 9/2008
JP 4313633 B2 8/2009

* cited by examiner

ADVANCING DIRECTION

FIG. 28

| ADVANCING DIRECTION | TARGET FLOOR ROBOT | ROTATION COUNT | DIRECTION OF ROTATION |
|---|---|---|---|
| (1) 79.2° OR MORE AND LESS THAN 100.8° | B | 2 | CLOCKWISE |
| | C | 2 | COUNTER-CLOCKWISE |
| (2) 100.8° OR MORE AND LESS THAN 135° | B | 1 | CLOCKWISE |
| | C | 3 | COUNTER-CLOCKWISE |
| (3) 135° OR MORE AND LESS THAN 169.2° | C | 4 | COUNTER-CLOCKWISE |
| (4) 169.2° OR MORE AND LESS THAN 190.8° | C | 3 | CLOCKWISE |
| | A | 1 | COUNTER-CLOCKWISE |
| (5) 190.8° OR MORE AND LESS THAN 225° | C | 2 | CLOCKWISE |
| | A | 2 | COUNTER-CLOCKWISE |
| (6) 225° OR MORE AND LESS THAN 259.2° | C | 1 | CLOCKWISE |
| | A | 3 | COUNTER-CLOCKWISE |
| (7) 259.2° OR MORE AND LESS THAN 280.8° | A | 4 | COUNTER-CLOCKWISE |
| (8) 280.8° OR MORE AND LESS THAN 315° | A | 3 | CLOCKWISE |
| | B | 1 | COUNTER-CLOCKWISE |
| (9) 315° OR MORE AND LESS THAN 349.2° | A | 2 | CLOCKWISE |
| | B | 2 | COUNTER-CLOCKWISE |
| (10) 349.2° OR MORE AND LESS THAN 10.8° | A | 1 | CLOCKWISE |
| | B | 3 | COUNTER-CLOCKWISE |
| (11) 10.8° OR MORE AND LESS THAN 45° | B | 4 | COUNTER-CLOCKWISE |
| (12) 45° OR MORE AND LESS THAN 79.2° | B | 3 | CLOCKWISE |
| | C | 1 | COUNTER-CLOCKWISE |

FIG. 36

| LOCATION | RANGE | EVENT | LIGHT AND BRIGHTNESS | SMELL | WARM OR COLD AIR |
|---|---|---|---|---|---|
| ENTRANCE X | 20m × 10m | 10:01 CAGE ARRIVAL<br>→CHIME<br>→DOOR OPEN AND CLOSE | DOWNLIGHT | SMELL OF FLOWER | |
| CAGE A | 1.6m × 1.3m | 10:01 OCCURRENCE OF POWER FAILURE<br>→ANNOUNCEMENT<br>ARRIVAL AT FLOOR<br>→CHIME<br>→DOOR OPEN AND CLOSE | INDIRECT LIGHT<br>RELATIVELY DARK | | COLD AIR |
| CAGE B | 2m × 1.7m<br>(LARGE VOLUME) | BED LOADING<br>→INTERFERENCE CHECK BY MAP DISPLAY | FLAT LIGHT<br>RELATIVELY BRIGHT | | COLD AIR |

INFORMATION PROCESSING SYSTEM

TECHNICAL FIELD

The present invention relates to an information processing system and, more particularly, to an information processing system including three movable bodies and an information processing apparatus to control each of the three movable bodies.

BACKGROUND ART

An apparatus which can give a user a sense of walking without changing the position of the user has been conventionally provided.

Patent reference 1 discloses, for example, an omnidirectional walking sense presentation apparatus that allows a walking person to make a walking motion in a narrow space without advance, by causing a movable floor to perform cyclic movement in which the movable floor is moved in the opposite direction to an advancing direction of the walking person when the walking person gets on the movable floor and then in the advancing direction of the walking person to return the movable floor to the front of the walking person when the walking person gets off the movable floor.

PRIOR ART REFERENCE

Patent Reference

Patent Reference 1: Japanese Patent No. 4313633

SUMMARY OF THE INVENTION

Problem to be Solved by the Invention

The movable floor in the omnidirectional walking sense presentation apparatus disclosed in patent reference 1 is quadrangular, and therefore it achieves a high degree of freedom of the movement but requires very complicated control according to the walking orientation. Furthermore, because a plurality of position detection sensors around the movable floor are necessary, the installation space is large, and the cost is accordingly high.

In view of this, the present invention aims to easily control a movable body to be moved in the direction in which a walking person walks, in accordance with the walking orientation of the walking person.

Means of Solving the Problem

An information processing system according to a first aspect of the present invention is an information processing system including three movable bodies and an information processing apparatus to control each of the three movable bodies. Each of the three movable bodies includes a main body formed into a regular hexagon having six vertices when viewed from above, the main body enabling a walking person to ride on an upper surface of the main body; a pressure sensor to detect a pressure applied to the upper surface when the walking person rides on the upper surface; a plurality of wheels attached under the main body; a driving unit to supply a driving force to at least two wheels of the plurality of wheels; and a movable body controller to move the main body linearly in any direction and to rotate the main body by using a perpendicular line at each of the six vertices as an axis, by controlling the at least two wheels and the driving unit in accordance with control from the information processing apparatus. Each of the three movable bodies is adjacent to other two movable bodies so that a position at which three vertices selected each from the three floor robots face each other is set as a central point. The information processing apparatus includes a movable body guidance unit to specify an advancing direction and a walking speed of the walking person based on the pressure when the walking person walks, to cause the three movable bodies to perform linear movement at the specified walking speed in an opposite direction to the specified advancing direction, to specify, as a target vertex, a vertex other than the three vertices which is able to be determined to lie in the specified advancing direction, and to cause at least one movable body of the three movable bodies to perform rotational movement so that a position of the target vertex is set as a new central point.

An information processing system according to a second aspect of the present invention is an information processing system including three movable bodies, an information processing apparatus to control each of the three movable bodies, an information server to provide information to the information processing apparatus, a display device to display video in accordance with control from the information processing apparatus, and a remote controller to accept input of an instruction from a walking person. Each of the three movable bodies includes a main body formed into a regular hexagon having six vertices when viewed from above, the main body enabling a walking person to ride on an upper surface of the main body; a pressure sensor to detect a pressure applied to the upper surface when the walking person rides on the upper surface; a plurality of wheels attached under the main body; a driving unit to supply a driving force to at least two wheels of the plurality of wheels; and a movable body controller to move the main body linearly in any direction and to rotate the main body by using a perpendicular line at each of the six vertices as an axis, by controlling the at least two wheels and the driving unit in accordance with control from the information processing apparatus. Each of the three movable bodies is adjacent to other two movable bodies so that a position at which three vertices selected each from the three floor robots face each other is set as a central point. The information server includes a stereoscopic model data storage unit to store a plurality of pieces of stereoscopic model data, each of the plurality of pieces of stereoscopic model data being used to generate video data of stereoscopic video seen from a visual point of the walking person in a virtual space; and a stereoscopic model selection unit to select one piece of the stereoscopic model data from the plurality of pieces of the stereoscopic model data in accordance with the instruction the input of which is accepted by the remote controller. The information processing apparatus includes a movable body guidance unit to specify an advancing direction and a walking speed of the walking person based on the pressure when the walking person walks, to cause the three movable bodies to perform linear movement at the specified walking speed in an opposite direction to the specified advancing direction, to specify, as a target vertex, a vertex other than the three vertices which is able to be determined to lie in the specified advancing direction, and to cause at least one movable body of the three movable bodies to perform rotational movement so that a position of the target vertex is set as a new central point; and a video control unit to specify a position of the walking person in the virtual space based on the specified advancing direction and the specified walking speed, and to generate the video data of the stereoscopic video corresponding to the specified position by referring to the selected stereoscopic model data. The display device displays the stereoscopic video in accordance with the video data generated by the video control unit.

Effects of the Invention

According to one or more aspects of the present invention, by using regular hexagonal movable bodies, a movable body to be moved in the direction in which a walking person walks can be easily controlled in accordance with the walking orientation of the walking person.

BRIEF DESCRIPTION OF THE DRAWINGS

FIG. 28 is a table illustrating a list of rotational-movement algorithms in Embodiment 1.

FIG. 36 is a schematic diagram illustrating an exemplary modal association dictionary in Embodiment 2.

MODE FOR CARRYING OUT THE INVENTION

Embodiment 1

Figure 1:
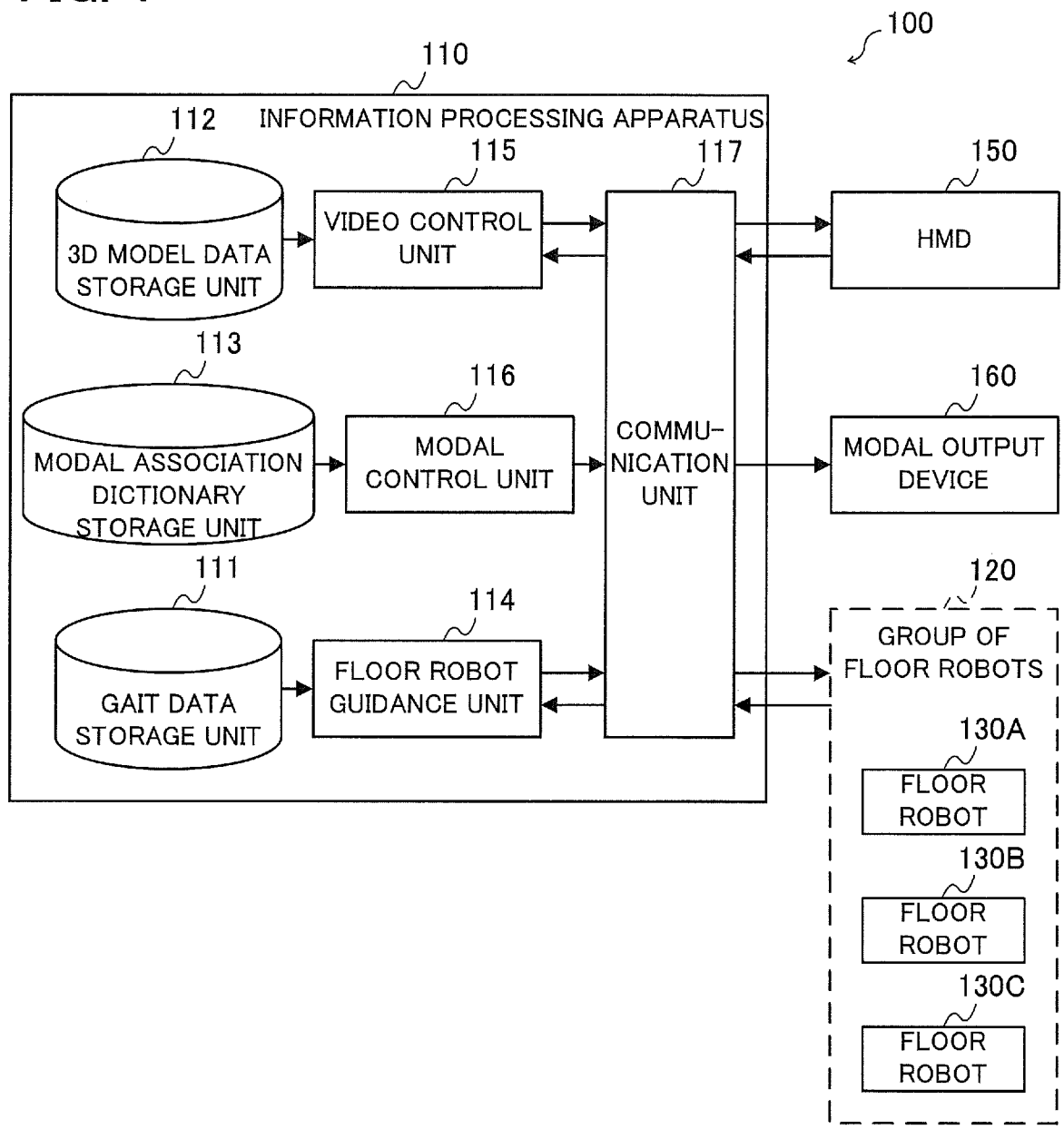
FIG. 1 is a block diagram schematically illustrating a configuration of an information processing system according to Embodiment 1.

FIG. 1 is a block diagram schematically illustrating a configuration of an information processing system 100 according to Embodiment 1.

The information processing system 100 includes an information processing apparatus 110, a group of floor robots 120 as a group of movable bodies, a Head Mounted Display (HMD) 150, and a modal output device 160.

The information processing system 100 uses the group of floor robots 120 to counteract an operation in which a walking person walks, and provides the walking person with video of a virtual space synchronized with the walking operation.

The information processing apparatus 110 includes a gait data storage unit 111, a Three-Dimensional (3D) model data storage unit 112, a modal association dictionary storage unit 113, a floor robot guidance unit 114, a video control unit 115, a modal control unit 116, and a communication unit 117.

The information processing apparatus 110 controls the group of floor robots 120, the HMD 150, and the modal output device 160.

The gait data storage unit 111 stores gait data indicating how a pressure is applied from the feet of the walking person to the group of floor robots 120, when the walking person walks on the group of floor robots 120.

The 3D model data storage unit 112 serves as a stereoscopic model data storage unit to store 3D model data (stereoscopic model data) required to generate video data of 3D video (stereoscopic video) seen from the visual point of the walking person in the virtual space.

The modal association dictionary storage unit 113 serves as a dictionary data storage unit to store a modal association dictionary (dictionary data) indicating a region to stimulate a sense other than the vision of the walking person, and contents of stimulation, in the virtual space of the 3D model data stored in the 3D model data storage unit 112. For example, the modal association dictionary specifies at least one content of an event, a brightness, a type of smell, and room temperature, for each predetermined region.

The floor robot guidance unit 114 serves as a movable body guidance unit to guide a plurality of floor robots 130A, 130B, and 130C included in the group of floor robots 120, in accordance with the walking speed and the advancing direction of the walking person.

For example, the floor robot guidance unit 114 acquires gait data of the walking person and stores the acquired gait data in the gait data storage unit 111. The floor robot guidance unit 114 controls linear movement and rotational movement of the floor robots 130A, 130B, and 130C by referring to the gait data stored in the gait data storage unit 111.

Figure 2:
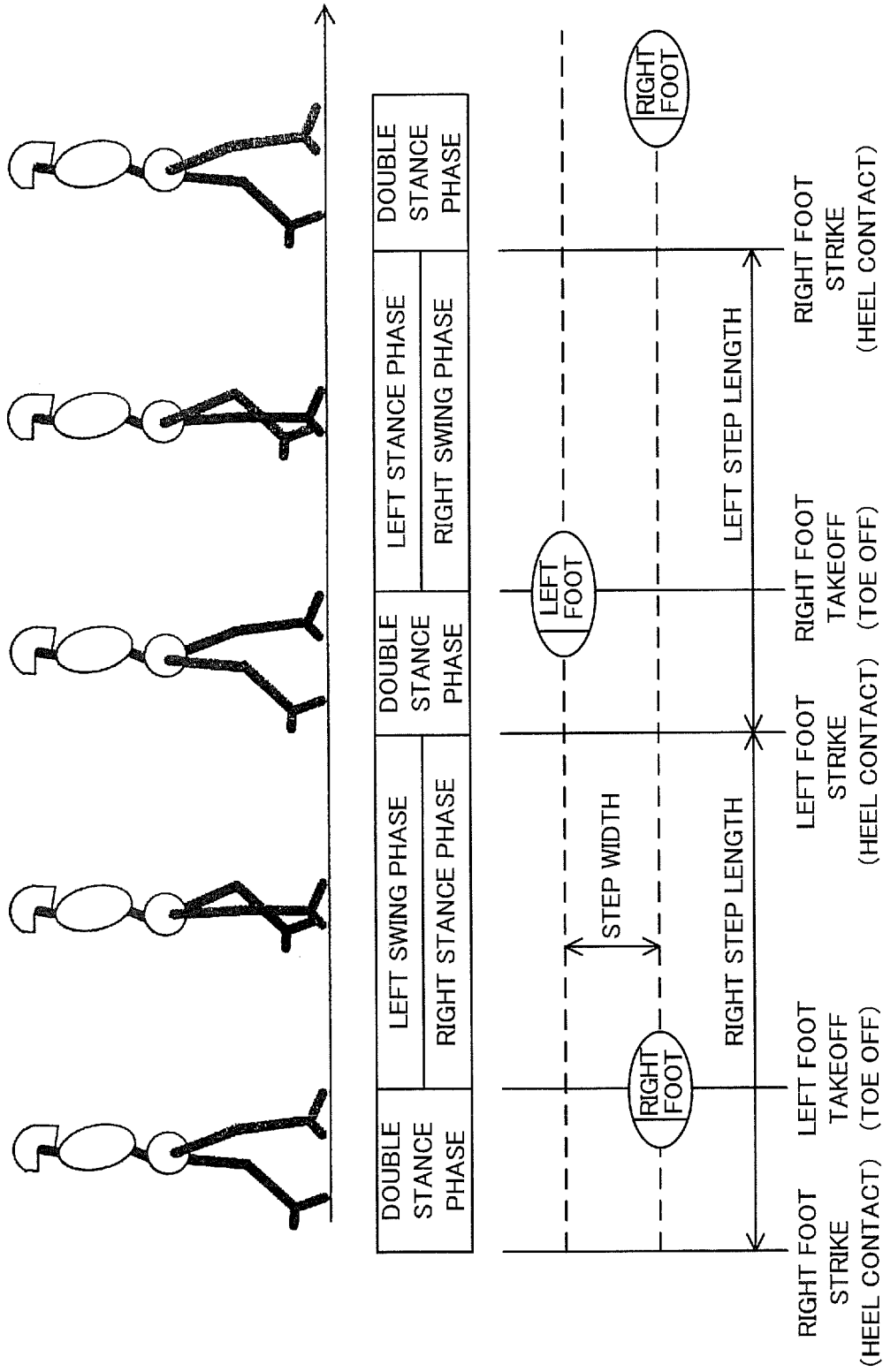
FIG. 2 is a schematic diagram for explaining a medical gait model in Embodiment 1.

Generally, a human being is known to walk based on a medical gait model as illustrated in FIG. 2. For details of the medical gait model, see, for example, Jacquelin Perry, Isao Takeda (Translation Supervisor), "Gait Analysis: Normal and Pathological Function," Ishiyaku Publishers, Inc., 2007.

As illustrated in FIG. 2, normally, the right step length and the left step length are equal, and the step width that is the lateral interval between a left foot and a right foot stays constant during walking.

Figure 3:
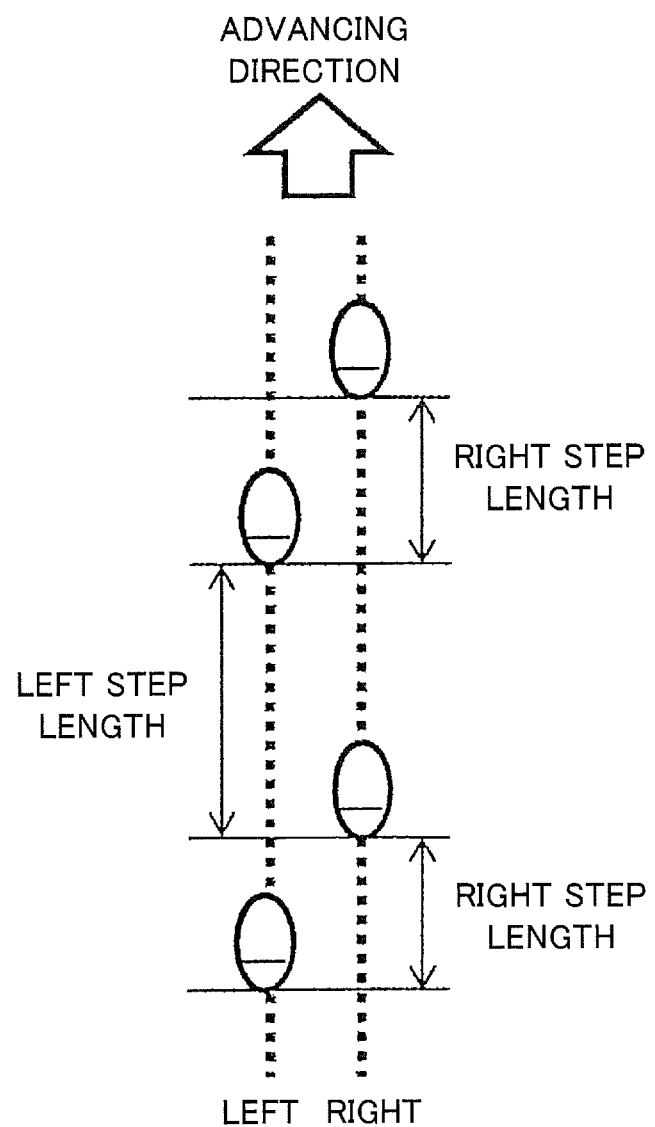
FIG. 3 is a schematic diagram for explaining the step length of the medical gait model in Embodiment 1.

However, as illustrated in FIG. 3, some people have step lengths different between the left and the right.

Figure 4:
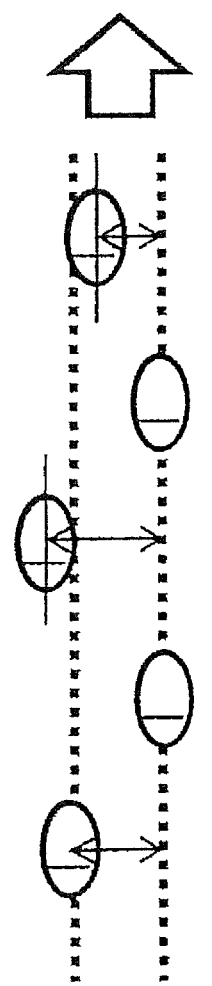
FIG. 4 is a schematic diagram for explaining the step width of the medical gait model in Embodiment 1.

As illustrated in FIG. 4, some people have step widths varying during walking, and body's centers of gravity shifting between the left and the right.

Figure 5A:
FIG. 5A to FIG. 5C are schematic diagrams for explaining a strike of the medical gait model in Embodiment 1.

As illustrated in FIG. 5A, normally, a foot lands first on its heel. When a foot takes off, generally its heel first takes off and then its toes are last to take off.

Figure 5B:
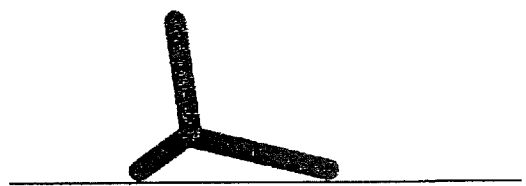
Figure 5C:
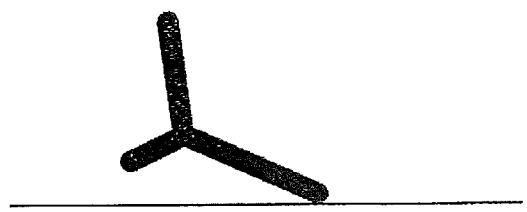

However, as illustrated in FIG. 5B, some people use their entire feet to land on the ground, and, as illustrated in FIG. 5C, some people first use their toes to land on the ground.

To return to FIG. 1, the floor robot guidance unit 114 acquires, in advance, gait data indicating a gait habit and trait unique to the walking person, by using a pressure sensor built into the surface of one of the group of floor robots 120 (to be described later), and uses it to estimate the walking speed and orientation, as described above.

The video control unit 115 specifies an advancing direction and a walking speed of the walking person walking on the group of floor robots 120, and specifies a position of the walking person in the virtual space, based on the specified advancing direction and walking speed. The video control unit 115 causes the HMD 150 to display 3D video corresponding to the specified position.

For example, the video control unit 115 generates video data of 3D video seen from the visual point of the walking person in the virtual space, by referring to the 3D model data stored in the 3D model data storage unit 112, and transmits the video data to the HMD 150. The HMD 150 displays the 3D video in the virtual space, based on the video data.

The modal control unit 116 serves as a stimulation control unit to cause the modal output device 160 to stimulate a sense of the walking person in accordance with the position of the walking person in the virtual space.

For example, the modal control unit 116 generates stimulation output data for stimulating a sense other than the vision of the walking person, based on the modal association dictionary stored in the modal association dictionary storage unit 113, and transmits the stimulation output data to the modal output device 160.

The modal output device 160 serves as a sensory stimulator to stimulate a sense other than the vision of the walking person in accordance with the stimulation output data.

The communication unit 117 communicates with the group of floor robots 120, the HMD 150, and the modal output device 160.

Figure 6:
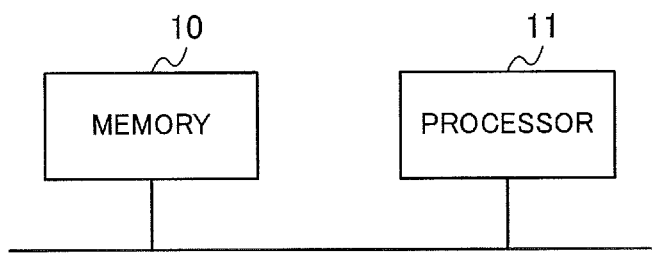
FIG. 6 is a block diagram schematically illustrating a hardware configuration in Embodiment 1.

The above-mentioned floor robot guidance unit 114, video control unit 115, and modal control unit 116 can be implemented by, for example, a memory 10, and a processor 11 such as a Central Processing Unit (CPU) to execute a program stored in the memory 10, as illustrated in FIG. 6. This program may be provided through a network, or may be recorded on a recording medium and provided as, for example, a program product.

The gait data storage unit 111, the 3D model data storage unit 112, and the modal association dictionary storage unit 113 can be implemented by the processor 11 using a non-volatile memory (not illustrated) such as an HDD (Hard Disk Drive).

The communication unit 117 can be implemented by the processor 11 using a wireless communication device (not illustrated) capable of communication in, for example, a wireless LAN.

The group of floor robots 120 includes three floor robots 130A, 130B, and 130C.

Each of the three floor robots 130A, 130B, and 130C has the same configuration and will therefore be referred to as a floor robot 130 unless any particular distinction is required between them.

The floor robot 130 function as a movable body that moves while carrying the walking person.

Figure 7:
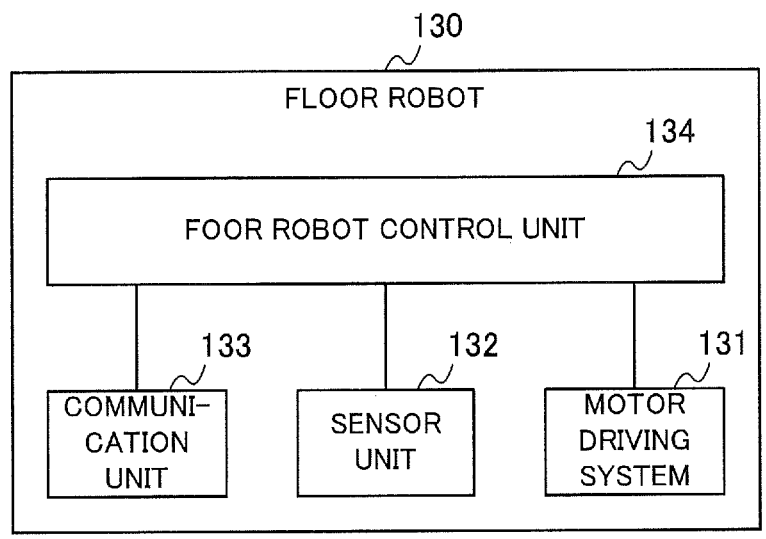
FIG. 7 is a block diagram schematically illustrating the architecture of a floor robot in Embodiment 1.

FIG. 7 is a block diagram schematically illustrating the architecture of the floor robot 130.

The floor robot 130 includes a motor driving system 131, a sensor unit 132, a communication unit 133, and a floor robot control unit 134.

The motor driving system 131 serves as a driving unit to supply driving force to the floor robot 130 in accordance with an instruction from the floor robot control unit 134.

The sensor unit 132 serves as various sensors to perform detection on the floor robot 130.

The communication unit 133 communicates with the information processing apparatus 110 by radio.

The floor robot control unit 134 serves as a movable body controller to control the operation of the floor robot 130 in accordance with control from the information processing apparatus 110.

Figure 8:
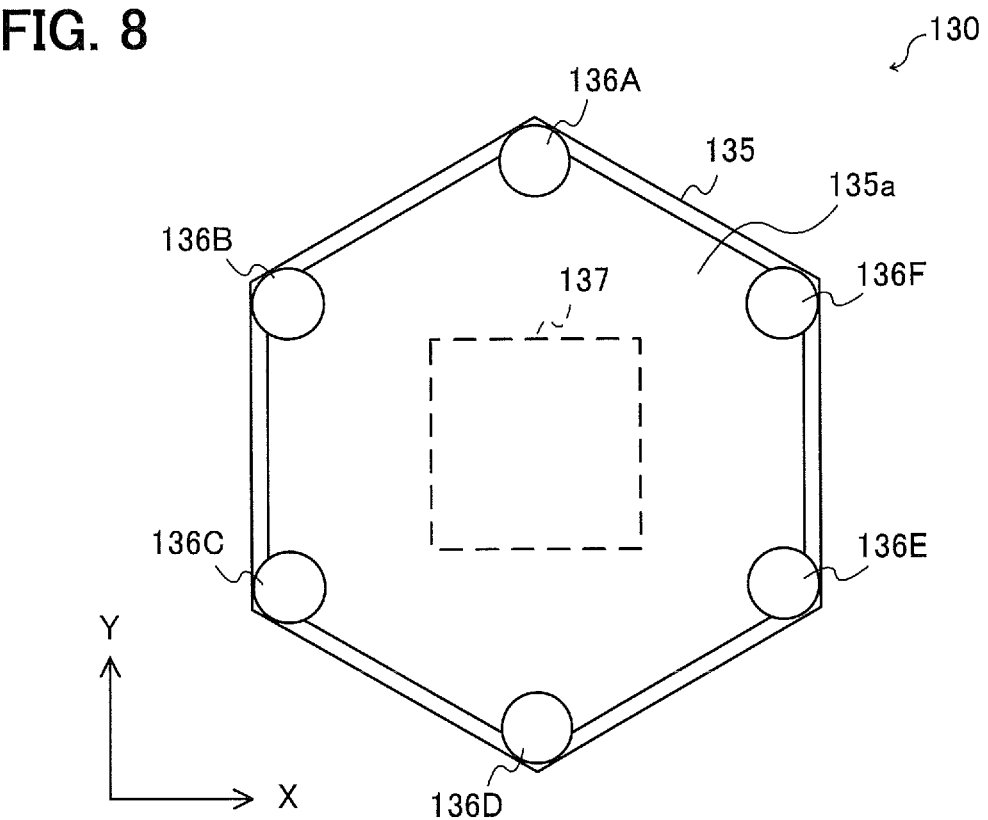
FIG. 8 is a bottom view of the floor robot in Embodiment 1.

FIG. 8 is a bottom view of the floor robot 130.

The floor robot 130 includes a main body 135, wheels 136A, 136B, 136C, 136D, 136E, and 136F, and a control board 137.

In Embodiment 1, the main body 135 has a lower surface 135a forming a regular hexagon.

The plurality of wheels 136A, 136B, 136C, 136D, 136E, and 136F are attached under the floor robot 130. In Embodiment 1, the six wheels 136A, 136B, 1360, 136D, 136E, and 136F are arranged at positions corresponding to the respective vertices of the lower surface 135a of the main body 135. Each of the six wheels 136A, 136B, 136C, 136D, 136E, and 136F is able to perform rotational movement on a first axis extending in a direction perpendicular to an X-Y plane illustrated in FIG. 8, and on a second axis extending in a direction parallel to the X-Y plane.

Each of the six wheels 136A, 136B, 136C, 136D, 136E, and 136F will be referred to as a wheel 136 unless any particular distinction is required between them.

The driving force is supplied from the motor driving system 131 to the two wheels 136A and 136D of the six wheels 136A, 136B, 136C, 136D, 136E, and 136F. In this manner, the floor robot 130 can perform linear movement and rotational movement in any directions by a two-wheel driving scheme. For example, the main body 135 can perform rotational movement by using a perpendicular line at each of the six vertices as an axis.

In Embodiment 1, the six wheels 136A, 136B, 136C, 136D, 136E, and 136F are attached, but the number of wheels 136 is not limited to six. For example, three or more wheels 136 may be attached.

In Embodiment 1, the driving force is supplied to the two wheels 136A and 136D, but it may be supplied to three or more wheels 136.

The control board 137 is provided inside the main body 135 and implements the floor robot control unit 134. The control board 137 controls linear movement and rotational movement of the floor robot 130 by controlling the rotation on the first axes and the second axes of the two wheels 136A and 136D to which the driving force is supplied from the motor driving system 131.

Figure 9:
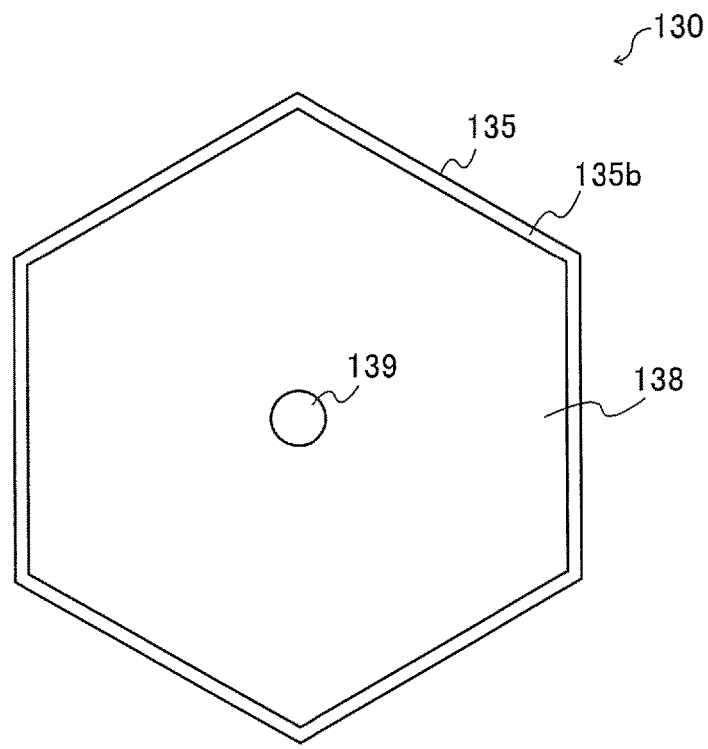
FIG. 9 is a top view of the floor robot in Embodiment 1.

FIG. 9 is a top view of the floor robot 130.

The main body 135 forms a regular hexagon having six vertices when viewed from above. In Embodiment 1, the main body 135 has an upper surface 135$b$ and a lower surface 135$a$ forming the same regular hexagon. The upper surface 135$b$ of the main body 135 can carry the walking person. The upper surface 135$b$ of the main body 135 has a size that allows the walking person carried on the upper surface 135$b$ to walk one to several steps.

A pressure sensor 138 to detect a pressure applied to the upper surface 135$b$ of the floor robot 130, when the walking person is on the upper surface 135$b$, is provided on the upper surface 135$b$. More specifically, a pressure sensor 138 to detect a pressure applied to the upper surface 135$b$ of the floor robot 130 is provided on the entire upper surface 135$b$. Pressure data indicating the value of the pressure detected by the pressure sensor 138 is provided to the floor robot control unit 134.

A camera 139 is provided at the center of the upper surface 135$b$ of the floor robot 130. Image data of an image taken by the camera 139 is provided to the floor robot control unit 134.

Figure 10:
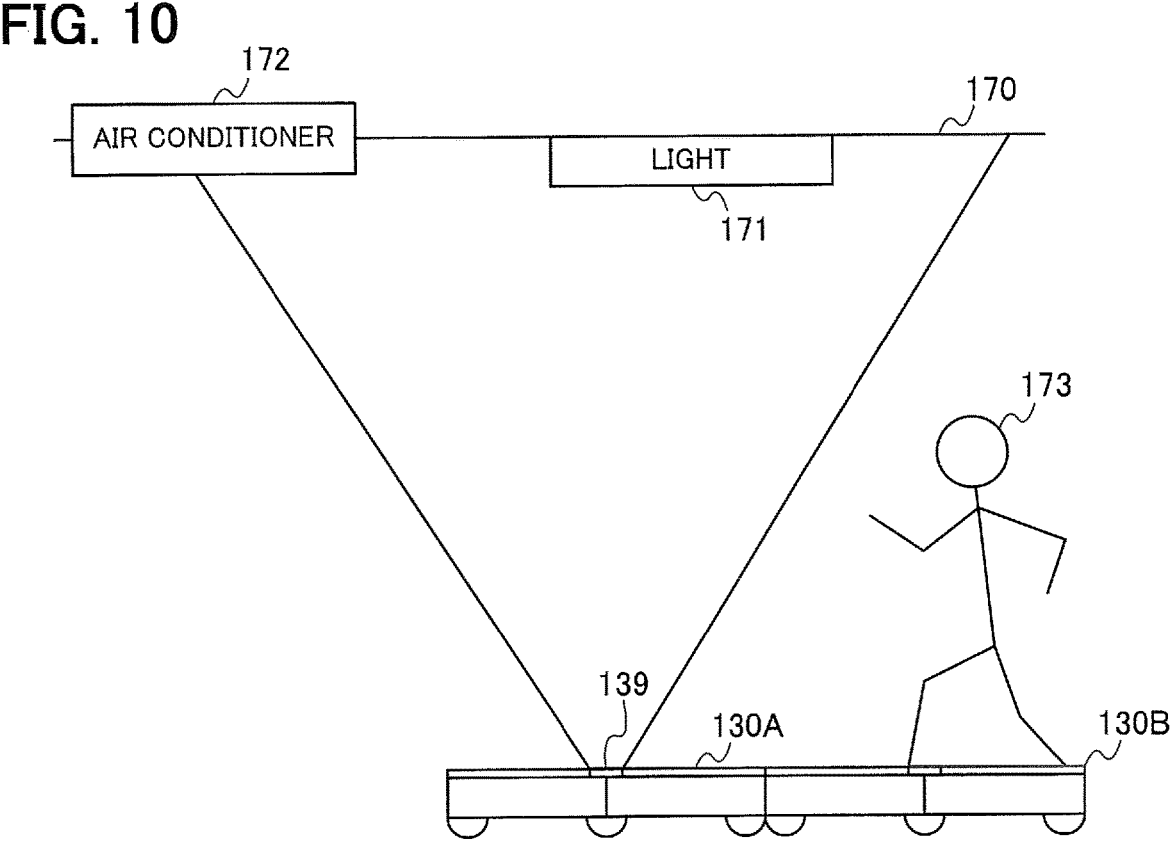
FIG. 10 is a schematic diagram for explaining a method for picking up an image by a camera of the floor robot in Embodiment 1.

As illustrated in FIG. 10, the camera 139 is placed to take an image of an area above the floor robot 130. The floor robot control unit 134 extracts feature points from, for example, a light 171 and an air conditioner 172 placed on a ceiling 170, and the pattern of the ceiling 170, based on the taken image, and calculates a two-dimensional position of the floor robot 130 in the horizontal direction. However, since the floor robot 130B carrying a walking person 173 cannot take an image of the ceiling 170 because of obstruction by the walking person 173, the camera 139 of the floor robot 130A moving ahead takes images of the ceiling 170 in sequence, and the floor robot control unit 134 detects its own position. Position data indicating the detected position is transmitted to the information processing apparatus 110 via the communication unit 133. The floor robot guidance unit 114 knows the positional relationship between the walking person 173 and the arrangement of the floor robots 130, and can therefore calculate a position of the walking person 173 from the position of the floor robot 130A.

The floor robot control unit 134 relatively specifies a foot position of the walking person from the pressure sensor 138. Foot position data indicating the specified foot position is transmitted to the information processing apparatus 110 via the communication unit 133. The floor robot guidance unit 114 can reduce sensor noise and enhance the accuracy of position data by using the foot position data, and the gait data stored in the gait data storage unit 111.

Figure 11:
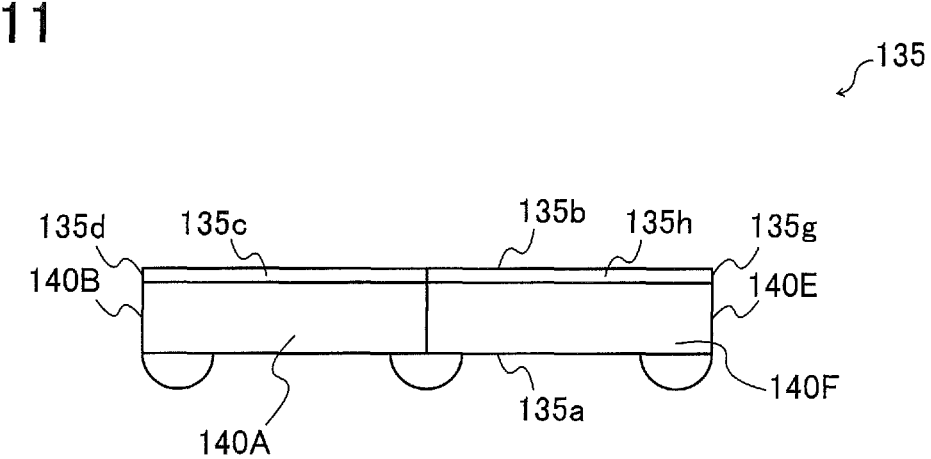
FIG. 11 is a side view of the floor robot in Embodiment 1.

FIG. 11 is a side view of the floor robot 130.

Six proximity sensors 140A, 140B, . . . , 140E, and 140F are provided on six side surfaces 135$c$, 135$d$, . . . , 135$g$, and 135$h$, respectively, of the floor robot 130.

Each of the six proximity sensors 140A, . . . , 140F will be referred to as a proximity sensor 140 unless any particular distinction is required between them.

The proximity sensors 140 are used to make the floor robots 130 adjacent to each other with no spaces between them. The proximity sensors 140 are also used to prevent a foot of the walking person 173 from being caught in any gap between the floor robots 130. Proximity data indicating the detection result obtained by the proximity sensor 140 is provided to the floor robot control unit 134.

Figure 12:
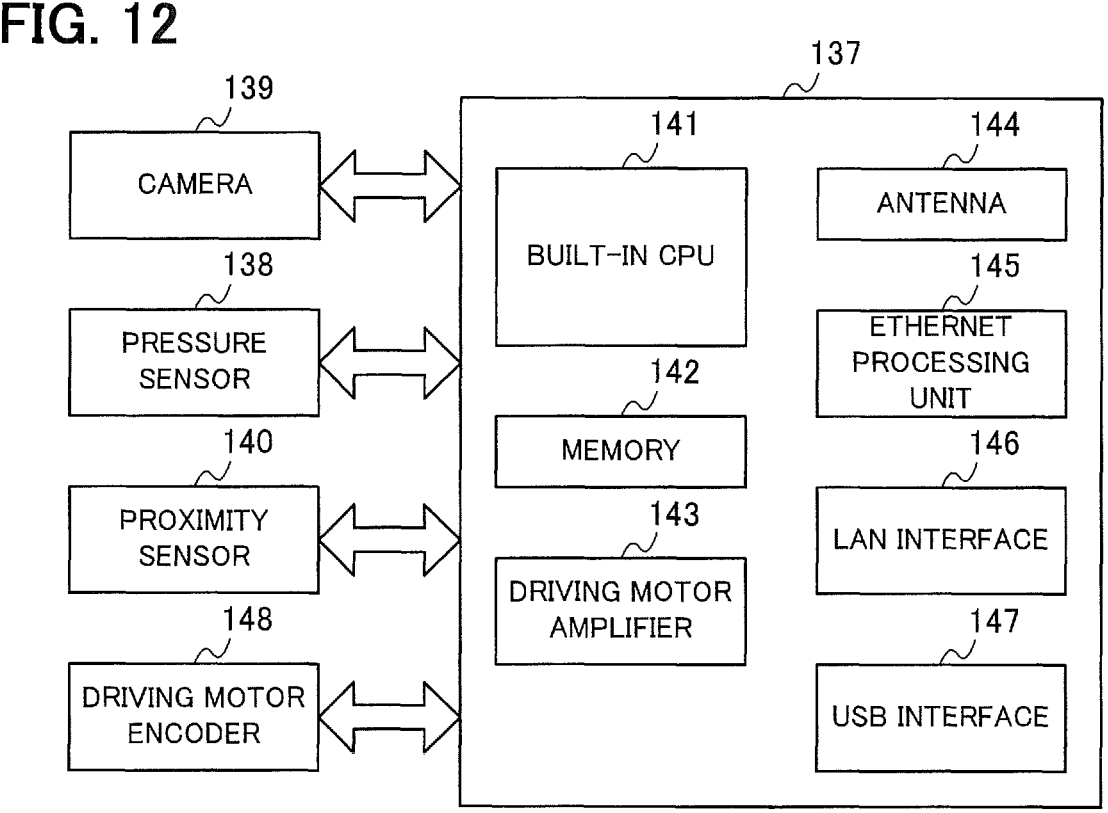
FIG. 12 is a block diagram schematically illustrating a configuration of a control board in Embodiment 1.

FIG. 12 is a block diagram schematically illustrating a configuration of the control board 137.

The control board 137 includes a built-in Central Processing Unit (CPU) 141, a memory 142, a driving motor amplifier 143, an antenna 144, an Ethernet processing unit 145, a Local Area Network (LAN) interface 146, and a Universal Serial Bus (USB) interface 147.

The built-in CPU 141 is a microprocessor having a clock frequency of 1 GHz or more to perform, in real time, for example, processing of sensor data, control of the motor driving system 131, and wireless LAN communication processing.

The memory 142 includes a volatile memory used as a main storage for operating a program of the built-in CPU 141, and a nonvolatile memory for storing program data.

The driving motor amplifier 143 converts digital data output by the program into analog data and provides the analog data to the motor driving system 131. The motor driving system 131 includes a driving motor encoder 148, and the built-in CPU 141 controls the motor driving system 131, based on data of, for example, a rotation direction, a rotation position, and a rotation speed obtained from the driving motor encoder 148.

The antenna 144, the Ethernet processing unit 145, and the LAN interface 146 serve as communication devices for communicating with the information processing apparatus 110 by a wireless LAN. The Ethernet processing unit 145 performs processing conforming to Ethernet (a registered trademark).

The USB interface 147 serves as an interface for downloading an updated program and conducting a diagnosis test of the floor robot 130.

Figure 13:
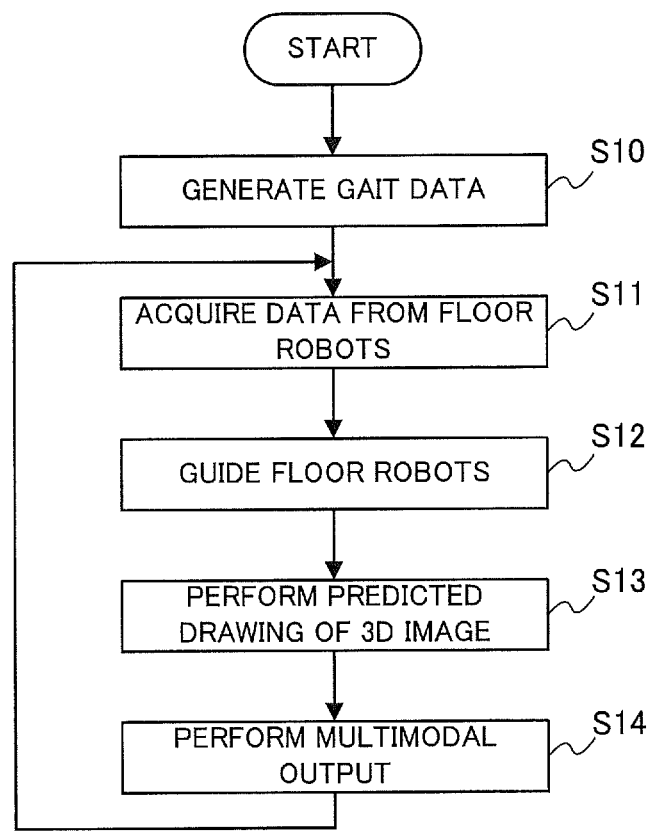
FIG. 13 is a flowchart illustrating processing by the information processing system according to Embodiment 1.

FIG. 13 is a flowchart illustrating processing by the information processing system 100 according to Embodiment 1.

First, to extract a habit of a gait unique to an individual, the floor robot guidance unit 114 instructs the walking person to normally walk on the floor robots 130, acquires pressure data via the communication unit 117, and generates gait data in the direction of rectilinear movement (S10). The generated gait data is stored in the gait data storage unit 111.

The floor robot guidance unit 114 then acquires, via the communication unit 117, data from each of the pressure sensors 138, the proximity sensors 140, and the cameras 139 built into the floor robots 130 (S11).

The floor robot guidance unit 114 makes a movement plan of the floor robots 130 and performs guidance processing of the floor robots 130, based on the gait data generated in step S10 and the data acquired in step S11 (S12). The floor robots 130 can make the walking person stay in the same place, apparently without advance of the walking person, by performing linear movement, in which the floor robots 130 are pulled back in the opposite direction to the direction in which the walking person walks, while the walking person is carried on the floor robots 130. Since the information processing system 100 according to Embodiment 1 includes the three floor robots 130, the floor robots 130 on which the walking person rides performs rotation movement to move ahead of the walking person in the forward direction, in accordance with an instruction from the floor robot guidance unit 114. By repeating the linear movement and the rotational movement of the floor robots 130, the walking person can continue to walk at the same position.

The video control unit 115 performs predicted drawing processing of 3D video by referring to the 3D model data stored in the 3D model data storage unit 112 (S13). For example, the video control unit 115 generates video data of 3D video of a virtual space seen from the visual point of the walking person, by referring to the 3D model data stored in the 3D model data storage unit 112, and transmits the video data to the HMD 150. To generate video data of 3D video of a virtual space, which is free from delay and is synchronized with a walking operation, the video control unit 115 predicts and draws a scene after an assumed delay time.

In Embodiment 1, the HMD 150 is used as a virtual space display device (display device), but another device such as an immersive display or an environmental display may be used in place of the HMD 150.

The modal control unit 116 generates stimulation output data for stimulating senses other than the vision of the walking person, such as a sound, a smell, and room temperature, based on the modal association dictionary stored in the modal association dictionary storage unit 113, and transmits the stimulation output data to the modal output device 160 (S14). In this case, the modal control unit 116 performs effective environmental control at an appropriate timing, based on the modal association dictionary stored in the modal association dictionary storage unit 113.

The processes in steps S11 to S14 of FIG. 13 are repeated for each refresh rate of the HMD 150. The frequency of the refresh rate is preferably set to 100 Hz or more to lessen video afterimages and prevent user's VR sickness.

Figure 14:
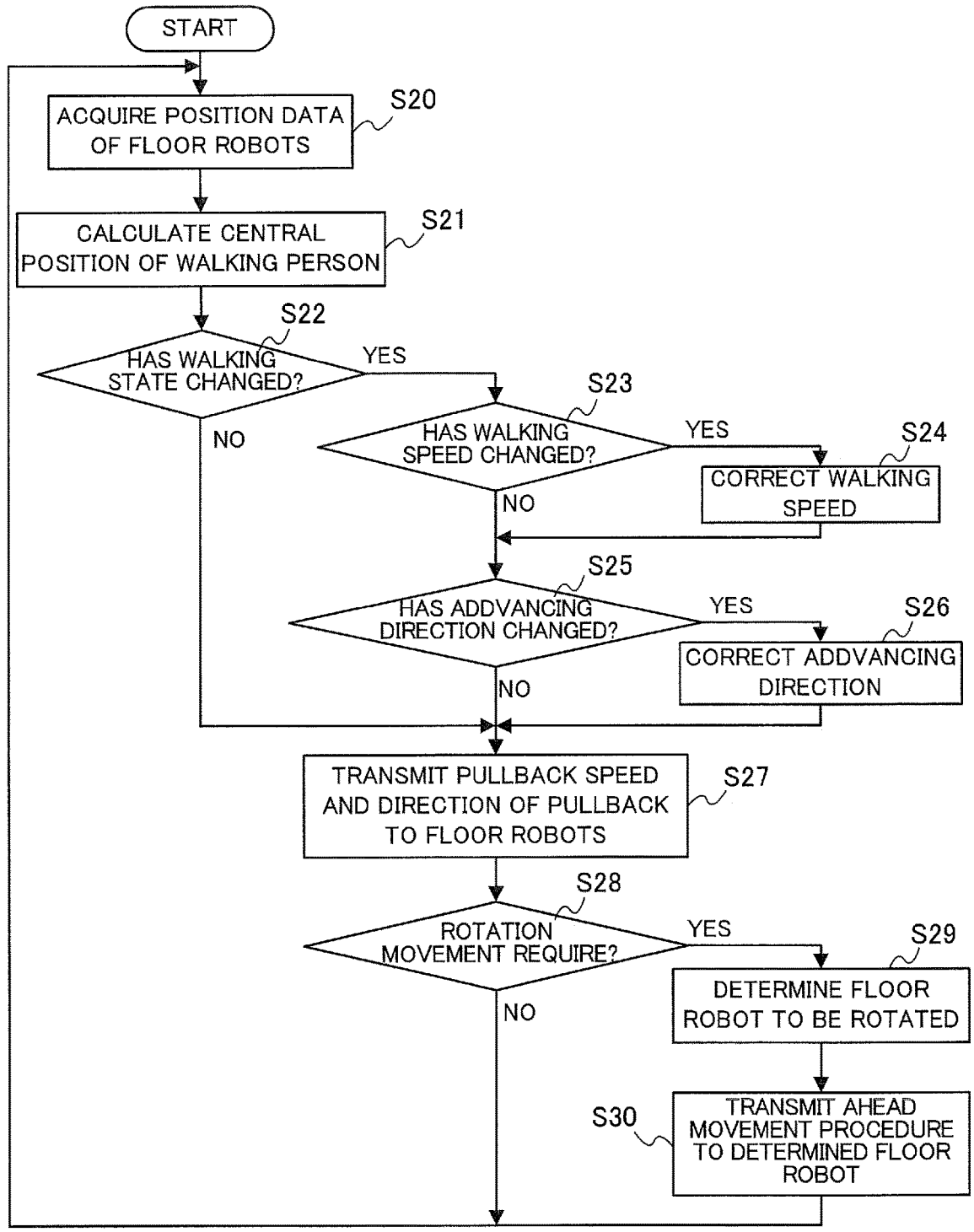
FIG. 14 is a flowchart illustrating floor robot guidance processing in Embodiment 1.

FIG. 14 is a flowchart illustrating the floor robot guidance processing in step S12 of FIG. 13.

First, the floor robot guidance unit 114 acquires position data from a floor robot 130 to perform rotational movement via the communication unit 117 (S20).

The floor robot guidance unit 114 then calculates a central position corresponding to the head of the walking person from the pressure data and the positional relationship among the floor robots 130, based on the acquired position data (S21).

The floor robot guidance unit 114 compares the currently calculated central position with the previously calculated central position, and determines whether the walking state has changed (S22). If the walking state has changed (Yes in step S22), since this has occurred due to a change in walking speed or advancing direction, the process proceeds to step S23. If the walking state has not changed (No in step S22), since the floor robots 130 pull back the walking person in the opposite direction to the advancing direction of the walking person at the same speed of the walking person, the process proceeds to step S27.

In step S23, the floor robot guidance unit 114 determines whether the walking speed of the walking person has changed. If the walking speed has changed (Yes in step S23), the process proceeds to step S24, or if the walking speed has not changed (No in step S23), the process proceeds to step S25.

In step S24, the floor robot guidance unit 114 corrects the walking speed. The process proceeds to step S25.

In step S25, the floor robot guidance unit 114 checks whether the advancing direction of the walking person has changed. If the advancing direction has changed (Yes in step S25), the process proceeds to step S26, or if the advancing direction has not changed (No in step S25), the process proceeds to step S27.

In step S26, the floor robot guidance unit 114 corrects the advancing direction. The process proceeds to step S27.

In step S27, the floor robot guidance unit 114 determines a pullback speed and a direction of pullback of the floor robots 130, and transmits control data indicating the determined pullback speed and direction of pullback to the three floor robots 130 via the communication unit 117. When, for example, the walking speed is corrected in step S24, the floor robot guidance unit 114 determines a linear-movement speed (pullback speed) of the floor robots 130 to a speed equal to the corrected walking speed. When the advancing direction is corrected in step S26, the floor robot guidance unit 114 determines a direction of linear movement (direction of pullback) of the floor robots 130 to the opposite direction to the corrected advancing direction.

The floor robot guidance unit 114 determines whether the rotational movement of any floor robot 130 is necessary from the advancing direction and the position of the walking person on the floor robots (S28). If the rotational movement of any floor robot 130 is necessary (Yes in step S28), the process proceeds to step S29, or if the rotational movement of any floor robot 130 is not necessary (No in step S28), the sequence ends.

In step S29, the floor robot guidance unit 114 determines a floor robot 130 to perform rotational movement.

The floor robot guidance unit 114 transmits instruction data indicating an appropriate ahead movement procedure to the determined floor robot 130 via the communication unit 117 (S30).

FIGS. 15A and 15B to 27 are schematic diagrams illustrating rotational-movement algorithms for controlling rotational movement of the floor robots 130.

In FIGS. 15A and 15B to 27, reference symbol A denotes the floor robot 130A, reference symbol B denotes the floor robot 130B, and reference symbol C denotes the floor robot 130C.

Figure 15A:
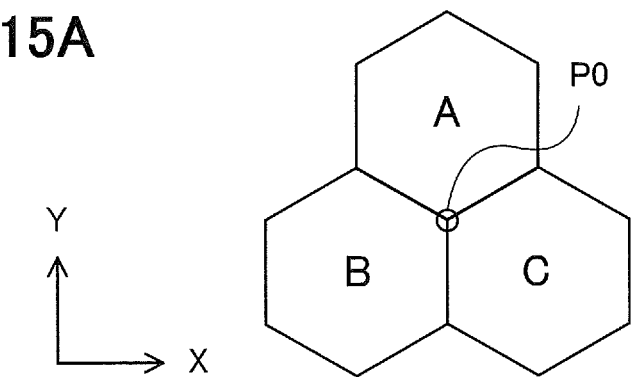
FIGS. 15A and 15B illustrates first schematic diagrams of a rotational-movement algorithm in Embodiment 1.
Figure 15B:
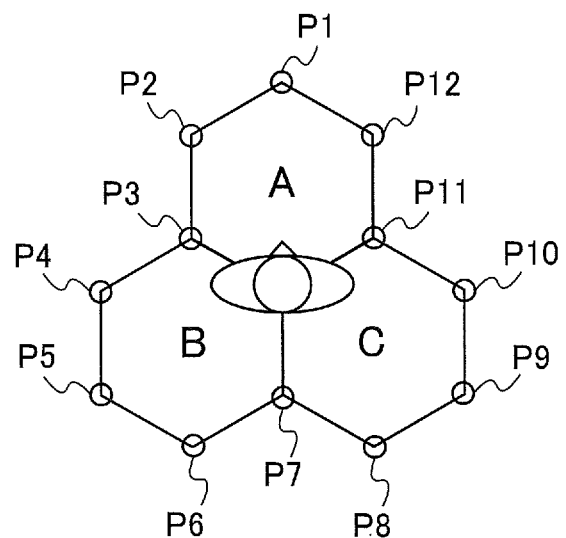

FIG. 15A and FIG. 15B are schematic diagrams illustrating the initial states of the three floor robots 130A to 130C and the walking person.

In Embodiment 1, as illustrated in FIG. 15A, the three floor robots 130A to 130C are adjacent to each other, and are arranged so that two sides of each of them are in contact with one side of each of the other floor robots. In this arrangement, one of the vertices of each of the three floor robots 130A to 130C is set as a central point P0. In other words, each of the three floor robots 130A to 130C is adjacent to the other two floor robots 130 so that a position at which three vertices selected from the three floor robots 130A to 130C each face each other is set as the central point P0.

The state in which the three floor robots 130A to 130C are arranged in this manner is the basic state of the three floor robots 130A to 130C. The floor robots 130 perform rotational movement to maintain this basic state, upon walking of the walking person, as will be described hereinafter.

As illustrated in FIG. 15B, which floor robots 130A to 130C perform rotational movement and how the rotational movement is performed are determined according to the direction in which the walking person 101 on around the central point P0 walks toward one of the points P1 to P12 corresponding to outer vertices of the floor robots 130A to 130C.

For example, the floor robot guidance unit 114 specifies an advancing direction and a walking speed of the walking person 101, based on the pressure detected by the pressure sensor 138, when the walking person 101 walks. The floor robot guidance unit 114 specifies, as a target vertex, a vertex that is able to be determined to lie in the specified advancing direction, other than the three vertices facing each other in the basic state. The floor robot guidance unit 114 controls at least one of the three floor robots 130A to 130C to perform rotational movement so that the position of the target vertex is set as a new central point.

Figure 16:
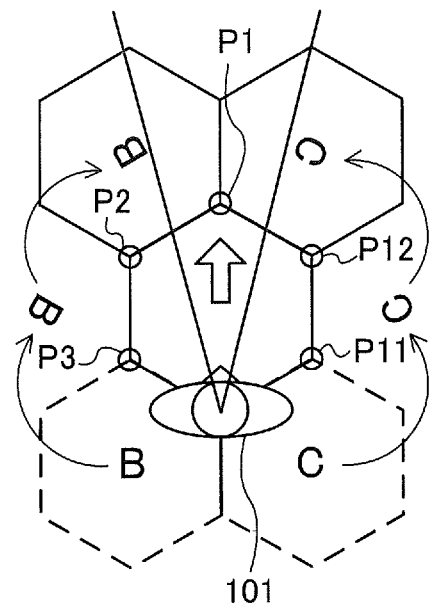
FIG. 16 is a second schematic diagram illustrating a rotational-movement algorithm in Embodiment 1.

FIG. 16 is a schematic diagram illustrating rotational movement of the floor robots 130 when the walking person 101 walks to the point P1.

As illustrated in FIG. 16, when the walking person 101 walks to the point P1 (target vertex), the floor robots 130B and 130C perform rotational movement so that the point P1 is set as a new central point. More specifically, the floor robot 130B performs rotational movement through 120° clockwise by using a perpendicular line at the point P3 as an axis, and further performs rotational movement through 120° clockwise by using a perpendicular line at the point P2 as an axis. The floor robot 130C performs rotational movement through 120° counterclockwise by using a perpendicular line at the point P11 as an axis, and further performs rotational movement through 120° counterclockwise by using a perpendicular line at the point P12 as an axis. Even while the floor robots 130B and 130C perform rotational movement, the floor robots 130A to 130C keep on moving in the opposite direction to the advancing direction of the walking person 101.

Figure 17:
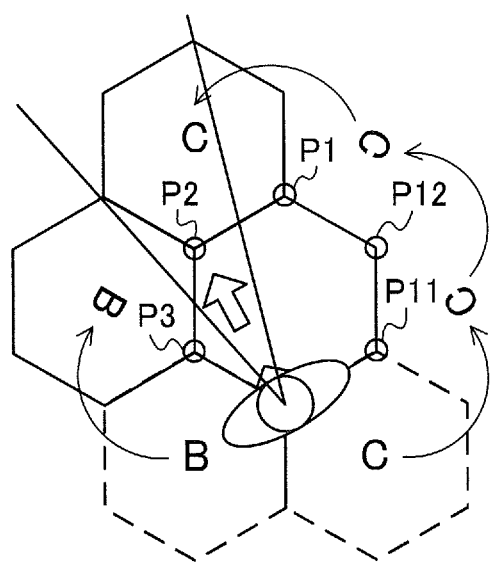
FIG. 17 is a third schematic diagram illustrating a rotational-movement algorithm in Embodiment 1.

FIG. 17 is a schematic diagram illustrating rotational movement of the floor robots 130 when the walking person 101 walks to the point P2.

As illustrated in FIG. 17, when the walking person 101 walks to the point P2, the floor robots 130B and 130C perform rotational movement so that the point P2 is set as a new central point. More specifically, the floor robot 130B performs rotational movement through 120° clockwise by using a perpendicular line at the point P3 as an axis. The floor robot 130C performs rotational movement through 120° counterclockwise by using a perpendicular line at the point P11 as an axis, performs rotational movement through 120° counterclockwise by using a perpendicular line at the point P12 as an axis, and further performs rotational movement through 120° counterclockwise by using a perpendicular line at the point P1 as an axis.

Figure 18:
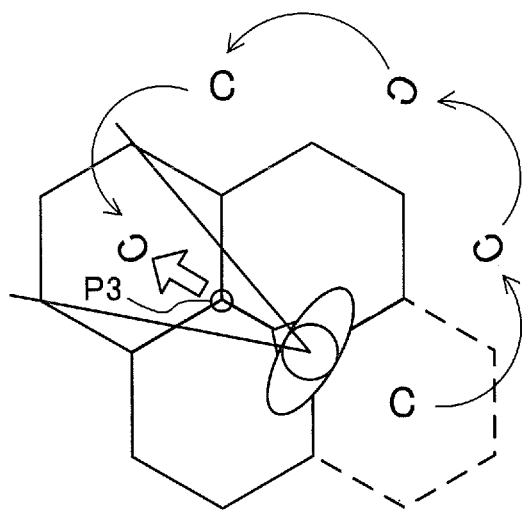
FIG. 18 is a fourth schematic diagram illustrating a rotational-movement algorithm in Embodiment 1.
Figure 19:
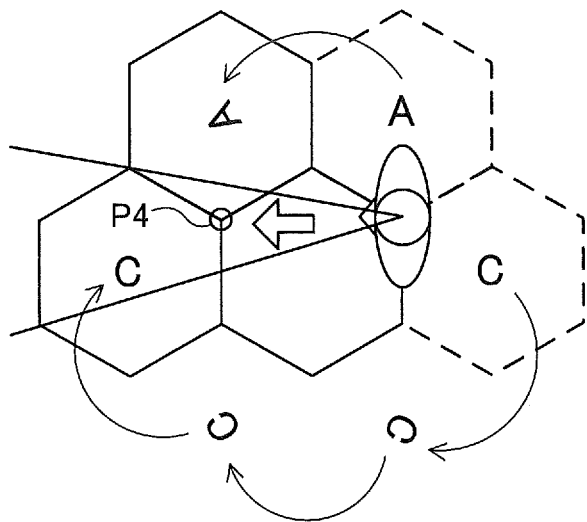
FIG. 19 is a fifth schematic diagram illustrating a rotational-movement algorithm in Embodiment 1.
Figure 20:
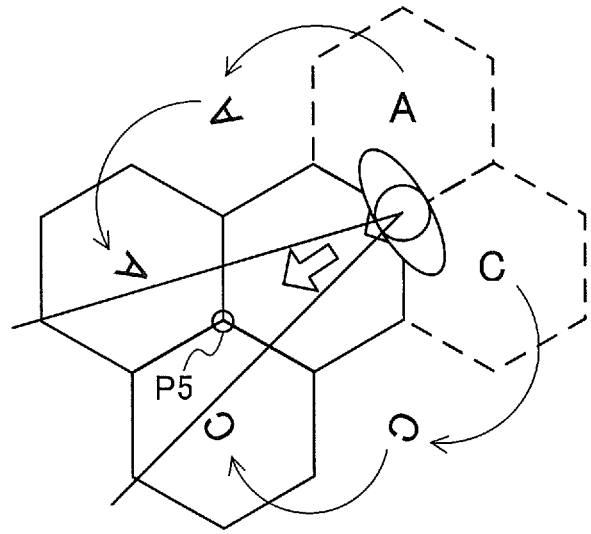
FIG. 20 is a sixth schematic diagram illustrating a rotational-movement algorithm in Embodiment 1.
Figure 21:
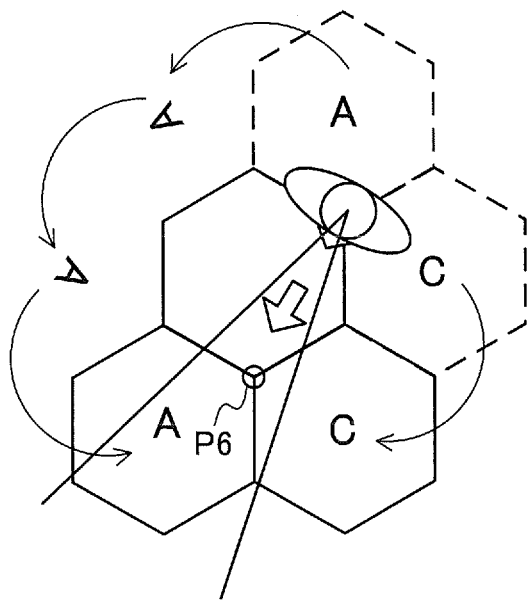
FIG. 21 is a seventh schematic diagram illustrating a rotational-movement algorithm in Embodiment 1.
Figure 22:
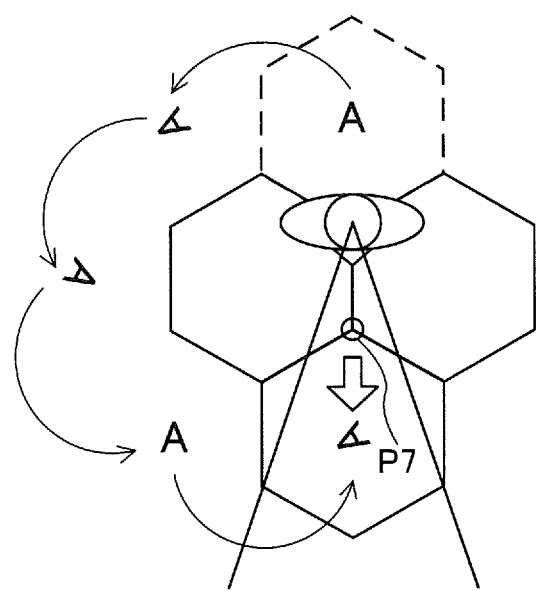
FIG. 22 is an eighth schematic diagram illustrating a rotational-movement algorithm in Embodiment 1.
Figure 23:
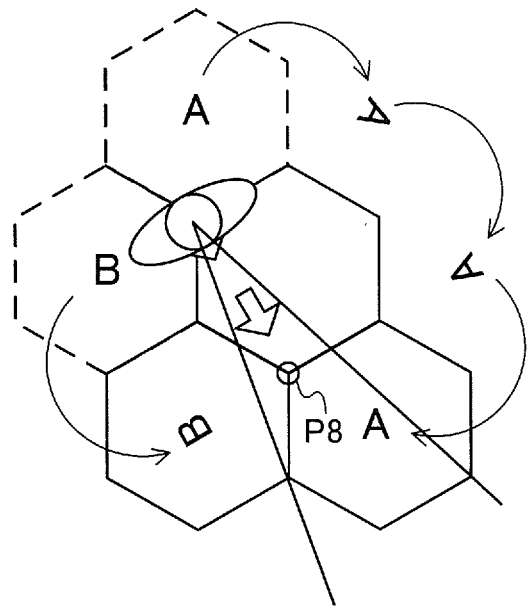
FIG. 23 is a ninth schematic diagram illustrating a rotational-movement algorithm in Embodiment 1.
Figure 24:
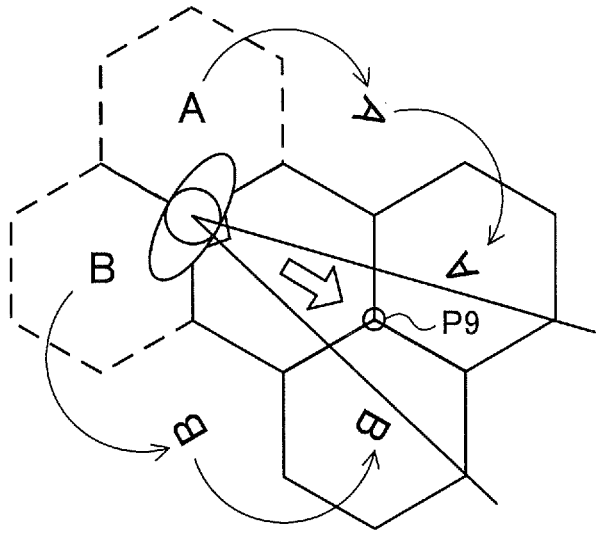
FIG. 24 is a 10th schematic diagram illustrating a rotational-movement algorithm in Embodiment 1.
Figure 25:
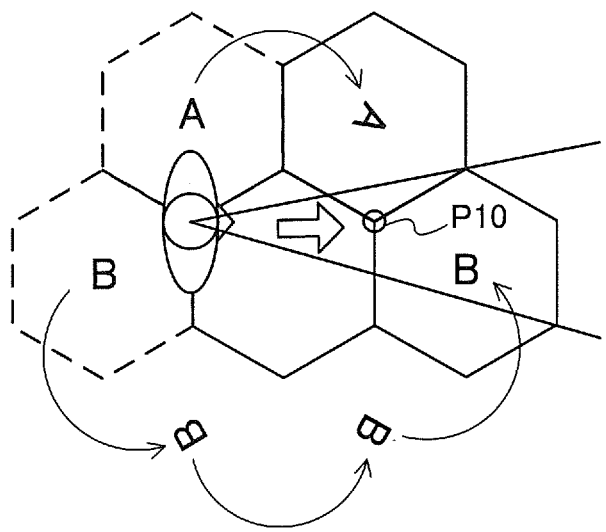
FIG. 25 is an 11th schematic diagram illustrating a rotational-movement algorithm in Embodiment 1.
Figure 26:
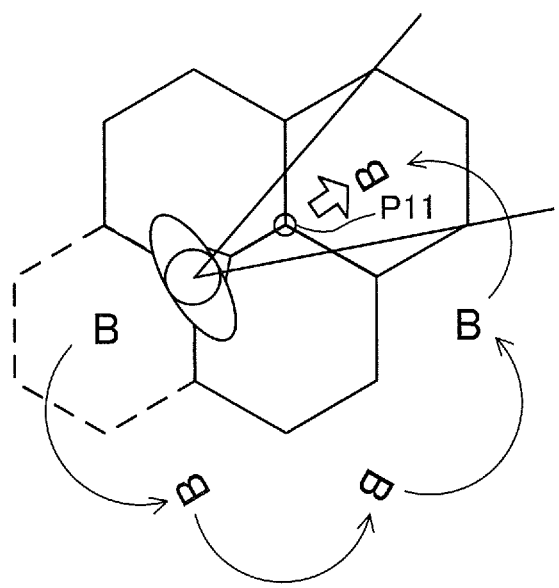
FIG. 26 is a 12th schematic diagram illustrating a rotational-movement algorithm in Embodiment 1.
Figure 27:
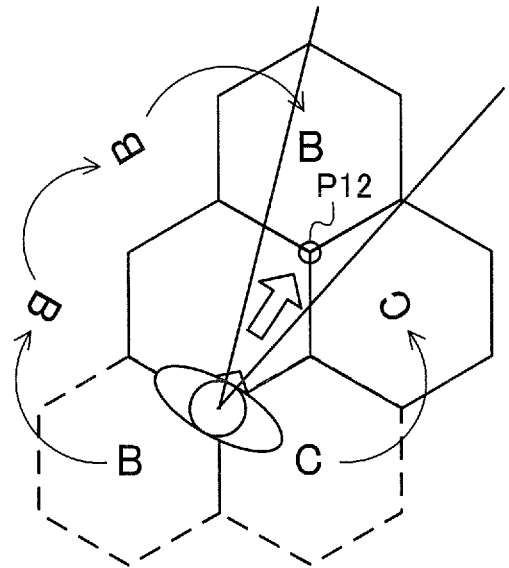
FIG. 27 is a 13th schematic diagram illustrating a rotational-movement algorithm in Embodiment 1.

Similarly, in FIG. 18, the floor robot 1300 performs rotational movement so that the point P3 is set as a new central point. In FIG. 19, the floor robots 130A and 130C perform rotational movement so that the point P4 is set as a new central point. In FIG. 20, the floor robots 130A and 130C perform rotational movement so that the point P5 is set as a new central point. In FIG. 21, the floor robots 130A and 130C perform rotational movement so that the point P6 is set as a new central point. In FIG. 22, the floor robot 130A performs rotational movement so that the point P7 is set as a new central point. In FIG. 23, the floor robots 130A and 130B perform rotational movement so that the point P8 is set as a new central point. In FIG. 24, the floor robots 130A and 130B perform rotational movement so that the point P9 is set as a new central point. In FIG. 25, the floor robots 130A and 130B perform rotational movement so that the point P10 is set as a new central point. In FIG. 26, the floor robot 130B performs rotational movement so that the point P11 is set as a new central point. In FIG. 27, the floor robots 130B and 130C perform rotational movement so that the point P12 is set as a new central point.

FIG. 28 is a table illustrating a list of the rotational-movement algorithms described with reference to FIGS. 15A and 15B to 27.

In FIG. 28 as well, reference symbol A denotes the floor robot 130A, reference symbol B denotes the floor robot 130B, and reference symbol C denotes the floor robot 130C.

As illustrated in FIG. 28, in Embodiment 1, an angular range of the advancing direction of the walking person 101, a target floor robot that is a floor robot 130 to perform rotational movement, a rotation count of the target floor robot, and a direction of rotational movement of the target floor robot, assuming that the positive direction of the X-axis in the X-Y plane illustrated in FIG. 15A is 0°, are determined in advance.

Each of these angular ranges is set to include a corresponding one of the outer points P1 to P12 of the floor robots 130A to 130C.

When the walking person walks, the floor robot guidance unit 114 specifies an angular range including a new central point from the advancing direction of the walking person, specifies a target floor robot, a rotation count of the target floor robot, and a direction of rotational movement of the target floor robot based on the specified angular range, and instructs the target floor robot to perform rotational movement.

The floor robot guidance unit 114 newly sets an X-Y plane, as illustrated in FIG. 15A, based on the new central point, and makes the target floor robot performs rotational movement based on the advancing direction of the walking person. By repeating this processing, the walking person 101 can get a natural sense of walking while staying in one place.

Figure 29:
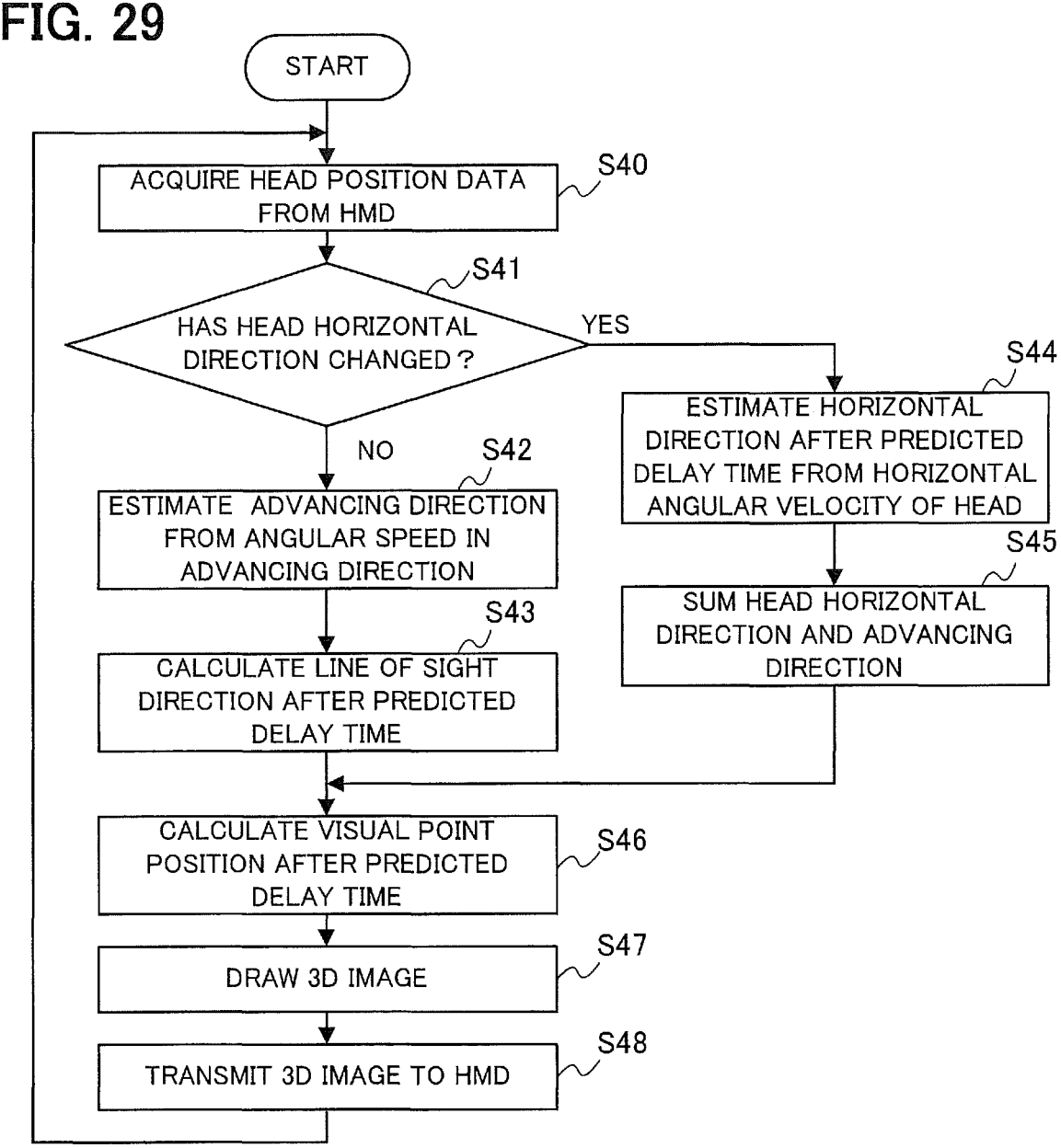
FIG. 29 is a flowchart illustrating predicted drawing processing of 3D video in Embodiment 1.

FIG. 29 is a flowchart illustrating predicted drawing processing of 3D video in step S13 of FIG. 13.

To acquire head position data in a rest state, the HMD 150 incorporates an acceleration sensor to detect accelerations about yaw, pitch, and roll axes, and an angular velocity sensor to detect angular velocities about these three axes.

Figure 30:
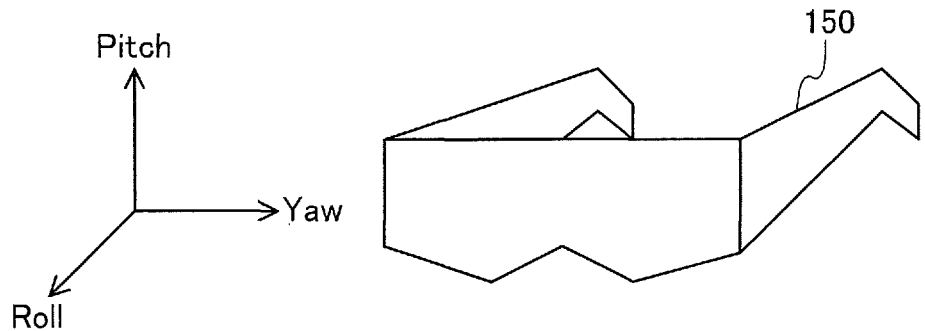
FIG. 30 is a schematic diagram for explaining the yaw, pitch, and roll axes of an HMD in Embodiment 1.

It is assumed, for example, that yaw, pitch, and roll axes are set for the HMD 150 as illustrated in FIG. 30.

The HMD 150 transmits, to the information processing apparatus 110, the head position data indicating the accelerations and the angular velocities on the yaw, pitch, and roll axes.

To return to FIG. 29, first, the video control unit 115 acquires head position data from the HMD 150 via the communication unit 117 (S40).

The video control unit 115 determines whether the horizontal direction of the head has changed from the angular velocity on the yaw axis included in the acquired head position data (S41). If the horizontal direction of the head has not changed (No in step S41), the process proceeds to step S42, or if the horizontal direction of the head has changed (Yes in step S41), the process proceeds to step S44.

In step S42, the video control unit 115 calculates an angular speed in the advancing direction from the difference between the previous advancing direction and the current advancing direction of the walking person, to estimate the advancing direction of the walking person.

The video control unit 115 sets the advancing direction of the walking person estimated in step S42 as a line of sight direction after a predicted delay time (S43). The process proceeds to step S46.

In step S44, the video control unit 115 estimates a horizontal direction after the predicted delay time from the angular velocity on the yaw axis.

The predicted delay time means herein the delay time from the start of drawing, that is, from the start of generating video data until 3D video is actually displayed on the HMD 150. The delay time depends on various factors such as the CPU processing performance, the graphics processing capacity, the number of polygons of a 3D model, the presence or absence of a texture map image, the memory capacity, the display resolution of the HMD 150, and the video communication state. Therefore, the predicted delay time needs to be predicted for each information processing system 100.

Next, the video control unit 115 calculates an angular speed in an advancing direction from the difference between the previous advancing direction and the current advancing direction of the walking person, to estimate the advancing direction of the walking person, and adds the head horizontal direction estimated in step S44 to the estimated advancing direction, thereby calculating a line of sight direction after the predicted delay time (S45).

In step S46, the video control unit 115 calculates a visual point position after the predicted delay time from the current walking speed. More specifically, the video control unit 115 calculates, as a visual point position of the walking person, a position after the walking person walks for the predicted delay time at the current walking speed in the estimated advancing direction from the current position of the walking person in a virtual space.

The video control unit 115 draws 3D video of the virtual space from the calculated line of sight direction and visual point position (S47). In this case, the video control unit 115 simultaneously performs various types of correction processing related to, for example, lens distortion of the HMD 150.

The video control unit 115 transmits the generated video data of the 3D video to the HMD 150 via the communication unit 117 (S48). In the above-mentioned way, the HMD 150 can display 3D video of a virtual space, free from delay synchronized with a walking operation and a head motion, and can therefore achieve smooth display causing less VR sickness.

When an immersive display or an environmental display is used in place of the HMD 150, it is unnecessary to acquire head position data in step S40, and the video control unit 115 calculates a line of sight direction and a visual point position from a change in advancing direction of the walking person.

Embodiment 2

Figure 31:
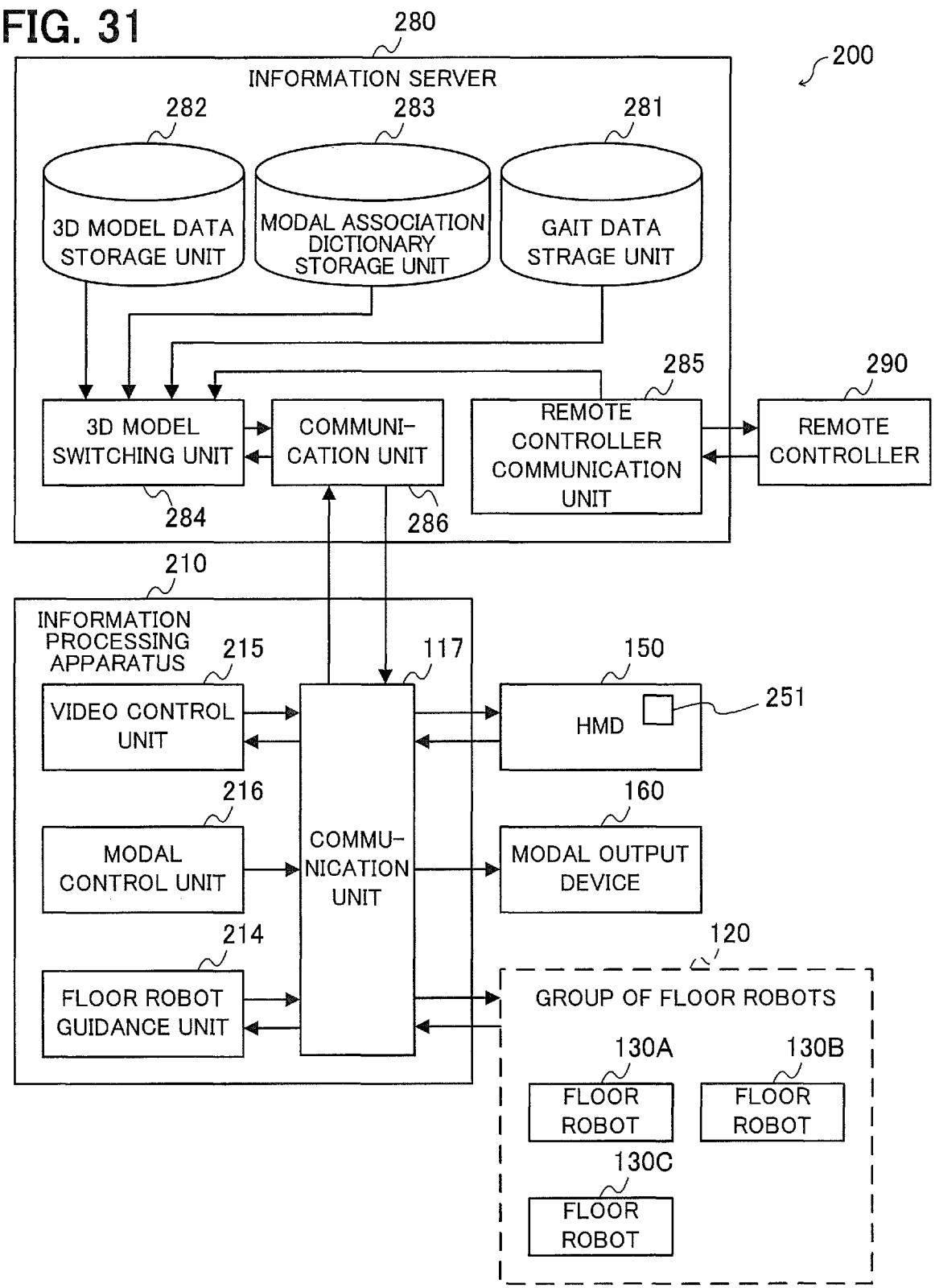
FIG. 31 is a block diagram schematically illustrating a configuration of an information processing system according to Embodiment 2.

FIG. 31 is a block diagram schematically illustrating a configuration of an information processing system 200 according to Embodiment 2.

The information processing system 200 includes an information processing apparatus 210, a group of floor robots 120, an HMD 150, a modal output device 160, an information server 280, and a remote controller 290.

The group of floor robots 120, the HMD 150, and the modal output device 160 of the information processing system 200 according to Embodiment 2 are similar to the group of floor robots 120, the HMD 150, and the modal output device 160 of the information processing system 100 according to Embodiment 1.

The information processing apparatus 210 in Embodiment 2 includes a floor robot guidance unit 214, a video control unit 215, a modal control unit 216, and a communication unit 117.

The communication unit 117 of the information processing apparatus 210 in Embodiment 2 is similar to the communication unit 117 of the information processing apparatus 110 in Embodiment 1.

The floor robot guidance unit 214 guides a plurality of floor robots 130 included in the group of floor robots 120, in accordance with the walking speed and the advancing direction of a walking person.

For example, the floor robot guidance unit 214 generates gait data of a walking person and transmits the generated gait data to the information server 280 via the communication unit 117. The floor robot guidance unit 214 controls linear movement and rotational movement of the floor robots 130, by referring to the gait data stored in the information server 280, via the communication unit 117.

The video control unit 215 generates video data of 3D video of a virtual space seen from the visual point of the walking person based on 3D model data transmitted from the information server 280, and transmits the video data to the HMD 150.

The modal control unit 216 generates stimulation output data for stimulating a sense other than the vision of the walking person based on a modal association dictionary transmitted from the information server 280, and transmits the stimulation output data to the modal output device 160.

The information server 280 includes a gait data storage unit 281, a 3D model data storage unit 282, a modal association dictionary storage unit 283, a 3D model switching unit 284, a remote controller communication unit 285, and a communication unit 286.

The gait data storage unit 281 stores gait data.

The 3D model data storage unit 282 stores a plurality of pieces of 3D model data.

The modal association dictionary storage unit 283 stores a plurality of modal association dictionaries.

The 3D model switching unit 284 functions as a stereoscopic model selection unit to select one piece of stereoscopic model data from a plurality of pieces of stereoscopic model data in accordance with an instruction input to a remote controller 290 via the remote controller communication unit 285.

More specifically, the 3D model switching unit 284 acquires, via the remote controller communication unit 285, a 3D model switching instruction (selection instruction) input to the remote controller 290, and reads one piece of 3D model data and one modal association dictionary corresponding to a 3D model selected to be displayed by the switching instruction from the 3D model data storage unit 282 and the modal association dictionary storage unit 283 respectively. The 3D model switching unit 284 transmits the read 3D model data and modal association dictionary to the information processing apparatus 210 via the communication unit 286.

The remote controller communication unit 285 receives a switching instruction signal (selection instruction signal) representing the 3D model switching instruction.

The remote controller 290 accepts input of a 3D model switching instruction from the walking person, and transmits a switching instruction signal representing the switching instruction to the information server 280 by radio such as infrared rays. The remote controller 290 may be a smartphone or a simple remote controller equipped with a cross cursor key and several buttons.

In a virtual space using the HMD 150, since the walking person cannot watch his or her hand to operate, the operability of the remote controller 290 is very poor. Therefore, the HMD 150 desirably takes an image of an operation at hand by using a camera 251 placed on the upper part of the HMD 150, and performs superimposed display of the picked-up video on 3D video of the virtual space. This allows the walking person to easily operate while watching an operation screen and his or her hand. When a display is used in place of the HMD 150, the superimposed display of camera video is unnecessary.

The above-mentioned 3D model switching unit 284 can be implemented by, for example, a memory 10, and a processor 11 such as a CPU to execute a program stored in the memory 10, as illustrated in FIG. 6. This program may be provided through a network, or may be recorded on a recording medium and provided as, for example, a program product.

The gait data storage unit 281, the 3D model data storage unit 282, and the modal association dictionary storage unit 283 can be implemented by causing the processor 11 to use a nonvolatile memory (not illustrated) such as an HDD.

The remote controller communication unit 285 can be implemented by causing the processor 11 to use a wireless communication device (not illustrated) capable of wireless communication such as infrared communication.

The communication unit 286 can be implemented by causing the processor 11 to use a wireless communication device (not illustrated) capable of communication in, for example, a wireless LAN.

In Embodiment 2, the information server 280 is provided separately from the information processing apparatus 210, but Embodiment 2 is not limited to this example. For example, the information server 280 may be omitted by making the information processing apparatus 210 equipped with the function of the information server 280.

FIGS. 32 to 35 are schematic diagrams for explaining examples in which the information processing system 200 according to Embodiment 2 is used to select and confirm a design of an elevator cage 20.

Generally, the interior of the elevator cage 20 includes a control panel, a display for the number of stories, a wall, a door, a ceiling, and a floor. For barrier-free use, a handrail and a mirror, for example, may be mounted.

Figure 33A:
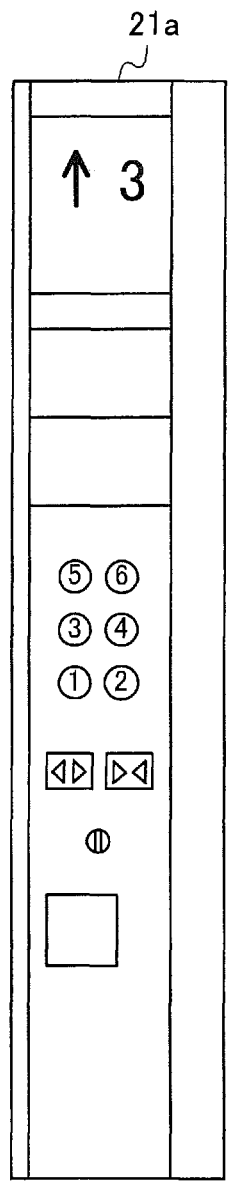
FIG. 33A to FIG. 33C are schematic diagrams for explaining examples of selection of a control panel of the elevator cage.
Figure 33B:
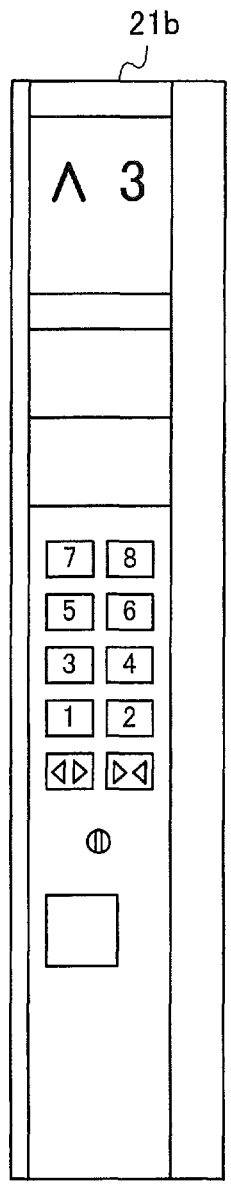
Figure 33C:
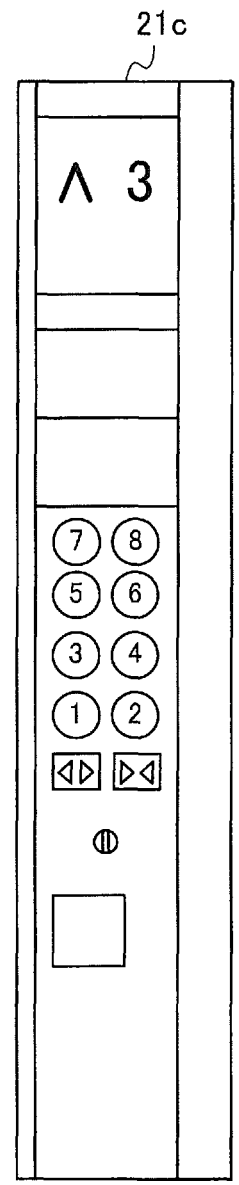
Figure 34A:
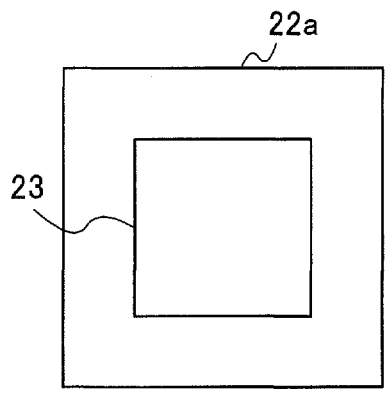
FIG. 34A to FIG. 34F are schematic diagrams for explaining examples of selection of a light on the ceiling of the elevator cage.
Figure 34B:
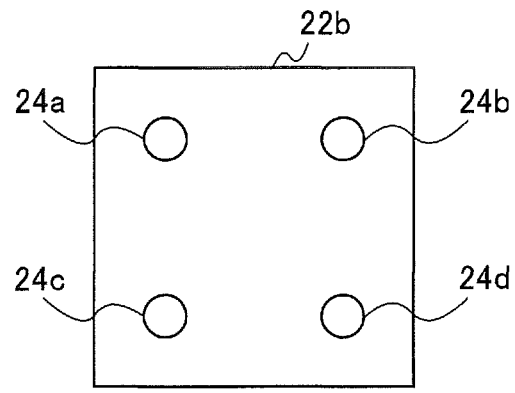
Figure 34C:
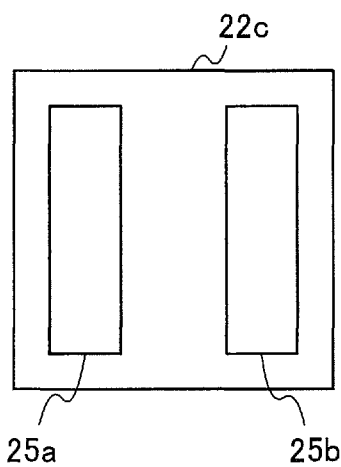
Figure 34D:
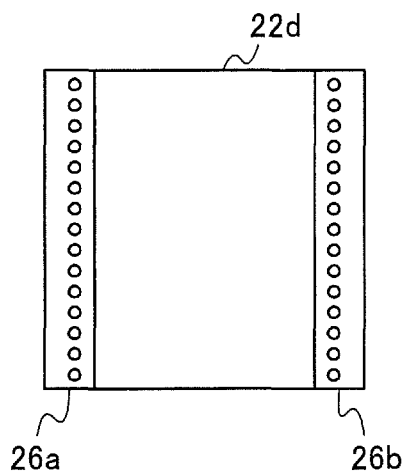
Figure 34E:
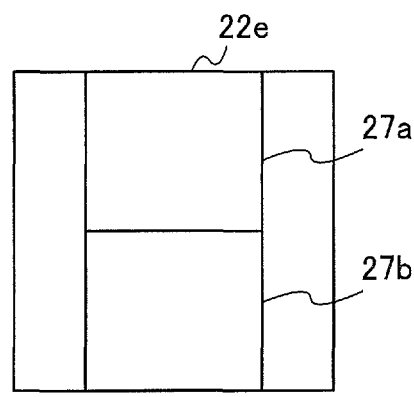
Figure 34F:
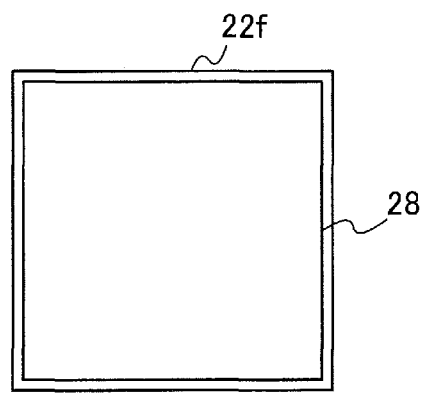

As illustrated in FIG. 33A to FIG. 33C, the types of buttons on control panels 21a to 21c differ for each destination country. Normally, 100 or more types of buttons are available for the control panels 21a to 21c.

As illustrated in FIG. 34A to FIG. 34F, lights on ceilings 22a to 22f include, for example, a flat light 23, downlights 24a to 24d, sloped lights 25a and 25b, indirect lights 26a and 26b, central arch lights 27a and 27b, and a glass cross entire surface light 28.

In this manner, for the interior of the elevator cage 20, it is necessary to appropriately select, in advance, a design suiting building owner's taste from combinations of an enormous number of designs. This design selection operation can be performed on the screen of a personal computer, but a design different from an originally assumed design may be selected depending on the direction and the angle to view.

Figure 32:
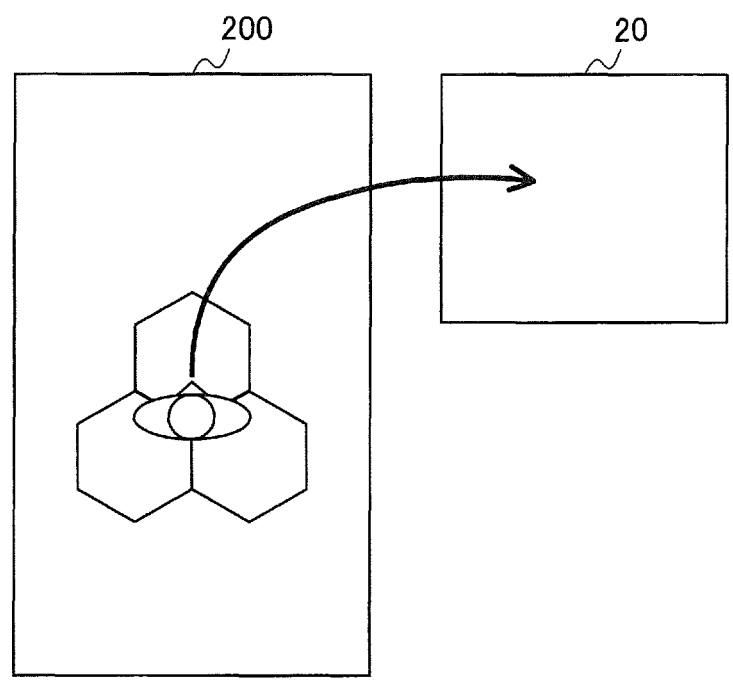
FIG. 32 is a schematic diagram for explaining an example in which the information processing system according to Embodiment 2 is applied to selection and confirmation of a design of an elevator cage.

In view of this, as illustrated in FIG. 32, the use of the information processing system 200 according to Embodiment 2 allows a building owner to actually view in various directions and angles while walking. Thus, the building owner can confirm a design in a form close to reality. In a design change operation, the remote controller 290 is used so that the design can be instantaneously switched and displayed by reading a 3D model of a designated part from the 3D model data storage unit 282 into the information processing apparatus 210.

Figure 35:
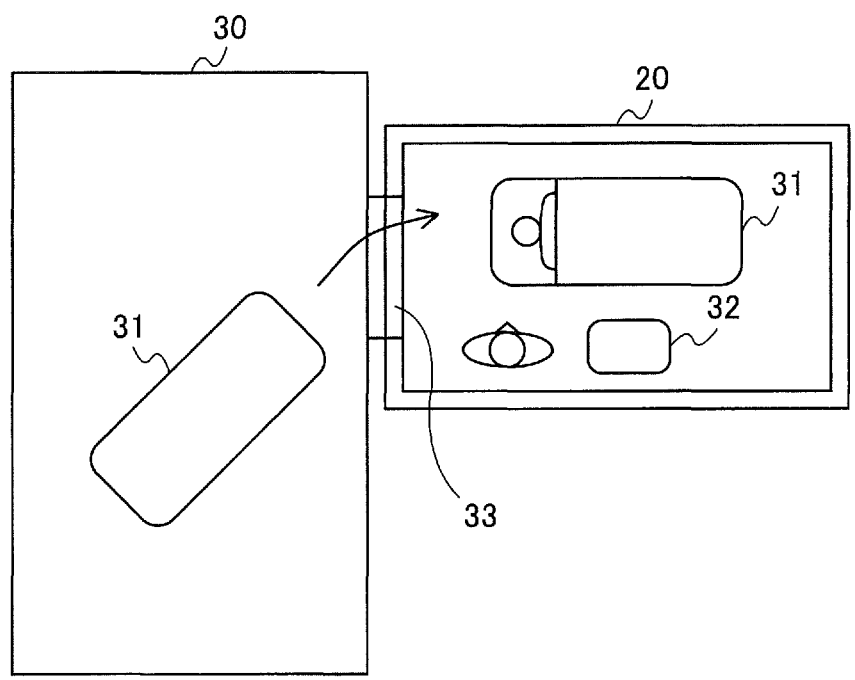
FIG. 35 is a schematic diagram for explaining a method for utilizing the information processing system according to Embodiment 2.

As illustrated in FIG. 35, by using 3D model data, it is possible to confirm, for example, whether a bed 31 and a medical device 32 can be loaded from an entrance 30 into the elevator cage 20 without interference with a door or a wall. It is also possible to confirm, for example, the opening and closing speed of a door 33, and an atmosphere and a feeling of oppression in the elevator cage 20 during congestion.

The modal control unit 216 can transmit, by using the modal output device 160, modal information, such as a sound, a smell, or room temperature, other than visual information. A modal association dictionary is used in control.

FIG. 36 is a schematic diagram illustrating an exemplary modal association dictionary.

A range 281c, an event 281d, a light and brightness 281e, a smell 281f, and warm or cold air 281g, for example, are registered in a modal association dictionary 281a for each location 281b.

A region in a virtual space to perform modal output is indicated by the location 281b and the range 281c.

In the example illustrated in FIG. 36, in an entrance X, a downlight is used, and a smell of a flower as in an exclusive hotel emanates. The cage arrives at 10:01, at which a chime rings and a door-open-and-close operation is performed at the same time.

In a cage A, a relatively low room temperature is set by air conditioning (cold air) in the presence of a relatively dark indirect light, and power failure occurs at 10:03, at which switching is made to an emergency light and emergency information is announced at the same time, and then the cage A arrives at a floor, and a chime rings and a door-open-and-close operation is performed at the same time.

Figure 37:
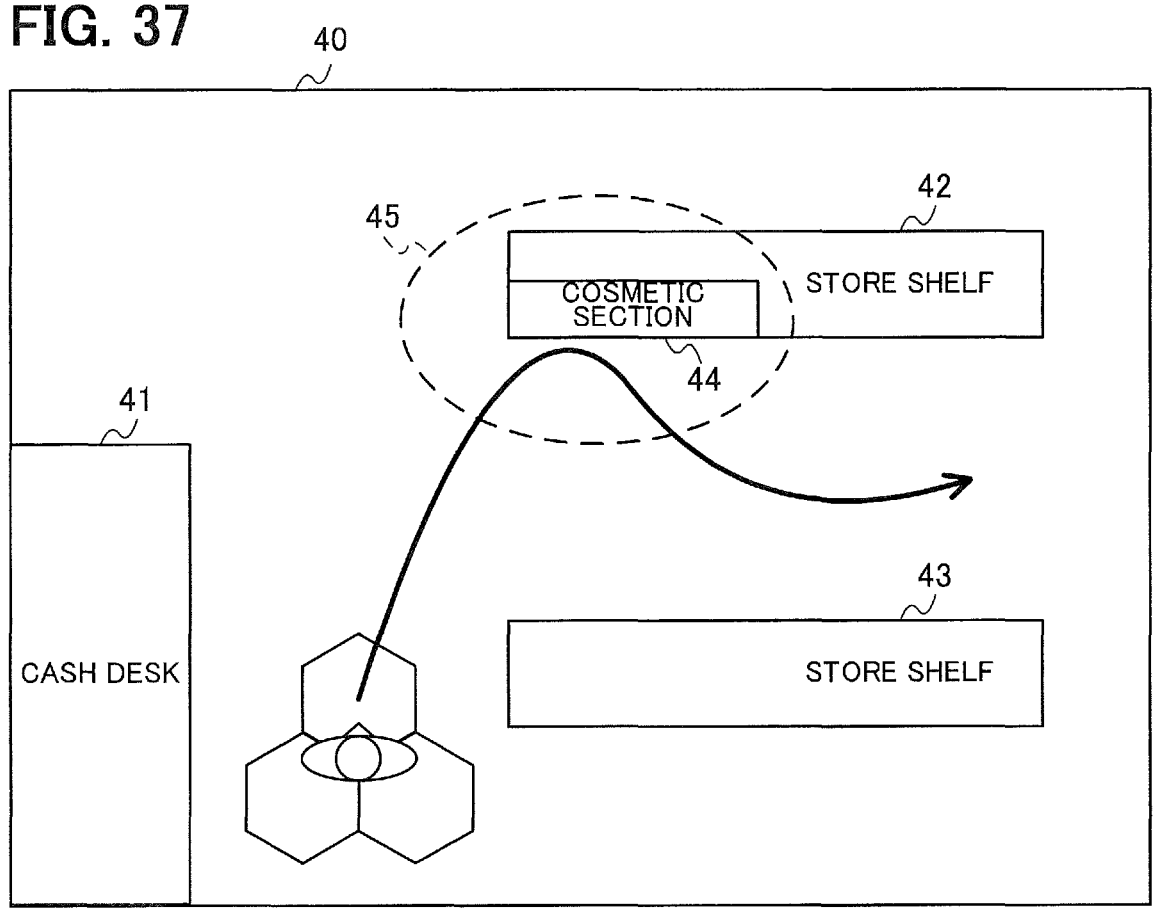
FIG. 37 is a schematic diagram for explaining an example in which the information processing system according to Embodiment 2 is applied to confirmation of a layout of a store.

FIG. 37 is a schematic diagram for explaining an example in which the information processing system 200 according to Embodiment 2 is used to confirm a layout of a store.

A cash desk 41 and store shelves 42 and 43 are placed in a store 40.

The store shelf 42 includes a cosmetic section 44. Therefore, when the walking person enters a predetermined region 45 including the cosmetic section 44, the modal control unit 216 causes the modal output device 160 to give off a smell of cosmetics. Hence, a stage effect as if cosmetics were actually present can be provided to the walking person on the group of floor robots 120.

By providing not only a store owner but also a consumer with an experience of the example illustrated in FIG. 37, the information processing system 200 can be used even for a consumer behavior survey on how commodities are arranged on store shelves to encourage the consumer to buy the commodities. For example, a buying behavior can be intuitively visualized by generating a consumer's sight-line heat map and performing its superimposed display on 3D store shelves. Since a layout of commodities in shelves is also designed by using a 3D model, horizontal exhibition, vertical exhibition, and an advertising slogan inventory tag, for example, can be easily changed. Hence, an optimal store design that improves the sales effect can be made in advance.

DESCRIPTION OF REFERENCE CHARACTERS 100, 200 information processing system; 110, 210 information processing apparatus; 111 gait data storage unit; 112 3D model data storage unit; 113 modal association dictionary storage unit; 114, 214 floor robot guidance unit; 115, 215 video control unit; 116, 216 modal control unit; 117 communication unit; 120 group of floor robots; 130 floor robot; 131 motor driving system; 132 sensor unit; 133 communication unit; 134 floor robot control unit; 135 main body; 136 wheel; 137 control board; 138 pressure sensor; 139 camera; 140 proximity sensor; 150 HMD; 251 camera; 160 modal output device; 280 information server; 281 gait data storage unit; 282 3D model data storage unit; 283 modal association dictionary storage unit; 284 3D model switching unit; 285 remote controller communication unit; 286 communication unit; 290 remote controller.

What is claimed is:

1. An information processing system comprising three movable bodies and an information processing apparatus to control each of the three movable bodies,
each of the three movable bodies comprising:
a main body formed into a regular hexagon having six vertices when viewed from above, the main body enabling a walking person to ride on an upper surface of the main body;
a pressure sensor to detect a pressure applied to the upper surface when the walking person rides on the upper surface;
a plurality of wheels attached under the main body;
a driving unit to supply a driving force to at least two wheels of the plurality of wheels; and
a movable body controller to move the main body linearly in any direction and to rotate the main body by using a perpendicular line at each of the six vertices as an axis, by controlling the at least two wheels and the driving unit in accordance with control from the information processing apparatus,
wherein each of the three movable bodies is adjacent to other two movable bodies so that a position at which three vertices selected each from the three movable bodies face each other is set as a central point, and
the information processing apparatus comprising:
a processor to execute a program; and
a memory to store the program which, when executed by the processor, performs processes of,
specifying an advancing direction and a walking speed of the walking person based on the pressure when the walking person walks,
causing the three movable bodies to perform linear movement at the specified walking speed in an opposite direction to the specified advancing direction,
specifying, as a target vertex, a vertex other than the three vertices which is able to be determined to lie in the specified advancing direction, and
causing at least one movable body of the three movable bodies to perform rotational movement so that a position of the target vertex is set as a new central point.

2. The information processing system according to claim 1, wherein the movable body controller rotates the main body through 120° on the axis.

3. The information processing system according to claim 1, wherein the processor specifies an angular range including the advancing direction from a plurality of predetermined angular ranges having the walking person as vertices, and specifies, as the target vertex, one vertex falling within the specified angular range among the six vertices.

4. The information processing system according to claim 1, further comprising a display device to display stereoscopic video of a virtual space in accordance with control from the information processing apparatus,
wherein the processor specifies a position of the walking person in the virtual space based on the specified advancing direction and the specified walking speed, and causes the display device to display the stereoscopic video corresponding to the specified position.

5. The information processing system according to claim 4, wherein the memory stores stereoscopic model data for generating video data of the stereoscopic video seen from a visual point of the walking person in the virtual space,
the processor generates the video data by referring to the stereoscopic model data, and
the display device displays the stereoscopic video in accordance with the video data.

6. The information processing system according to claim 5, wherein
a delay time from start of generating the video data until display of the stereoscopic video on the display device is set in the processor in advance, and
the processor generates the video data at a position after walking for the delay time at the specified walking speed in the specified advancing direction from the specified position in the virtual space.

7. The information processing system according to claim 5, further comprising a remote controller to accept input of an instruction from the walking person, wherein
the memory stores a plurality of pieces of the stereoscopic model data,
the processor selects one piece of the stereoscopic model data from the plurality of pieces of the stereoscopic model data in accordance with the instruction the input of which is accepted by the remote controller, and
the processor generates the video data by referring to the selected piece of the stereoscopic model data.

8. The information processing system according to claim 4, further comprising a sensory stimulator to stimulate a sense other than vision of the walking person,
wherein the processor causes the sensory stimulator to stimulate the sense in accordance with the specified position.

9. The information processing system according to claim 8, wherein
the memory dictionary data specifying at least one content of an event, a brightness, a type of smell, and room temperature for each predetermined region, and
the processor causes the sensory stimulator to stimulate the sense in accordance with the content specified by using the dictionary data when the specified position is included in the predetermined region.

10. An information processing system comprising three movable bodies, an information processing apparatus to control each of the three movable bodies, an information server to provide information to the information processing apparatus, a display device to display video in accordance with control from the information processing apparatus, and a remote controller to accept input of an instruction from a walking person,
each of the three movable bodies comprising:

a main body formed into a regular hexagon having six vertices when viewed from above, the main body enabling a walking person to ride on an upper surface of the main body;
a pressure sensor to detect a pressure applied to the upper surface when the walking person rides on the upper surface;
a plurality of wheels attached under the main body;
a driving unit to supply a driving force to at least two wheels of the plurality of wheels; and
a movable body controller to move the main body linearly in any direction and to rotate the main body by using a perpendicular line at each of the six vertices as an axis, by controlling the at least two wheels and the driving unit in accordance with control from the information processing apparatus,
wherein each of the three movable bodies is adjacent to other two movable bodies so that a position at which three vertices selected each from the three movable bodies face each other is set as a central point,
the information server comprising:
a first memory to store a plurality of pieces of stereoscopic model data, each of the plurality of pieces of the stereoscopic model data being used to generate video data of stereoscopic video seen from a visual point of the walking person in a virtual space, and to store a program; and
a first processor to select, by executing the program stored in the first memory, one piece of the stereoscopic model data from the plurality of pieces of the stereoscopic model data in accordance with the instruction the input of which is accepted by the remote controller,
the information processing apparatus comprising:
a second processor to execute a program; and
a memory to store the program which, when executed by the processor, performs processes of,
specifying an advancing direction and a walking speed of the walking person based on the pressure when the walking person walks,
causing the three movable bodies to perform linear movement at the specified walking speed in an opposite direction to the specified advancing direction,
specifying, as a target vertex, a vertex other than the three vertices which is able to be determined to lie in the specified advancing direction,
causing at least one movable body of the three movable bodies to perform rotational movement so that a position of the target vertex is set as a new central point,
specifying a position of the walking person in the virtual space based on the specified advancing direction and the specified walking speed,
generating the video data of the stereoscopic video corresponding to the specified position by referring to the selected stereoscopic model data, and
the display device displaying the stereoscopic video in accordance with the video data generated by the video control unit.

* * * * *